(12) United States Patent (10) Patent No.: US 12,584,716 B1

Cucereanu (45) Date of Patent: Mar. 24, 2026

(54) AERIAL DRONE INCAPACITATOR

(71) Applicant: Dorian Cucereanu, Staten Island, NY (US)

(72) Inventor: Dorian Cucereanu, Staten Island, NY (US)

( * ) Notice: Subject to any disclaimer, the term of this patent is extended or adjusted under 35 U.S.C. 154(b) by 6 days.

(21) Appl. No.: 18/958,221

(22) Filed: Nov. 25, 2024

(51) Int. Cl.
F41H 11/02 (2006.01)
G06V 20/52 (2022.01)
G06V 20/60 (2022.01)

(52) U.S. Cl.
CPC ............. F41H 11/02 (2013.01); G06V 20/52 (2022.01); G06V 20/60 (2022.01)

(58) Field of Classification Search
CPC ........ F41H 11/02; F41H 13/006; G06V 20/52
See application file for complete search history.

(56) References Cited

U.S. PATENT DOCUMENTS

| | | | |
|---|---|---|---|
| 6,904,838 | B1 | 6/2005 | Dindl |
| D753,543 | S | 4/2016 | Yauheni et al. |

| | | | | |
|---|---|---|---|---|
| 10,689,109 | B2 | 6/2020 | Wypyszynski et al. | |
| 10,907,940 | B1 * | 2/2021 | Parker .................... | G06N 20/00 |
| 11,472,550 | B2 | 10/2022 | Smith et al. | |
| 11,834,173 | B2 | 12/2023 | Smith et al. | |
| 2002/0134365 | A1 | 9/2002 | Gray | |
| 2010/0132580 | A1 | 6/2010 | Nazdratenko | |
| 2020/0108925 | A1 * | 4/2020 | Smith .................... | B64U 70/30 |
| 2022/0214144 | A1 * | 7/2022 | Indelicato ............... | G01S 17/86 |
| 2023/0351902 | A1 * | 11/2023 | Lim ......................... | G08G 5/59 |

FOREIGN PATENT DOCUMENTS

| | | |
|---|---|---|
| CA | 2291809 C | 12/1998 |

* cited by examiner

*Primary Examiner* — J. Woodrow Eldred

(74) *Attorney, Agent, or Firm* — Jones Intellectual Property

(57) ABSTRACT

This application describes a portable system for safely and non-destructively intercepting aerial and ground-based objects using advanced sensor technology and net deployment mechanisms. The system detects and tracks objects, identifies targets, and deploys a net for interception. Designed for flexibility, the system features automatic reloading for continuous operation and is adaptable to various environments, making it suitable for security and defense applications.

20 Claims, 10 Drawing Sheets

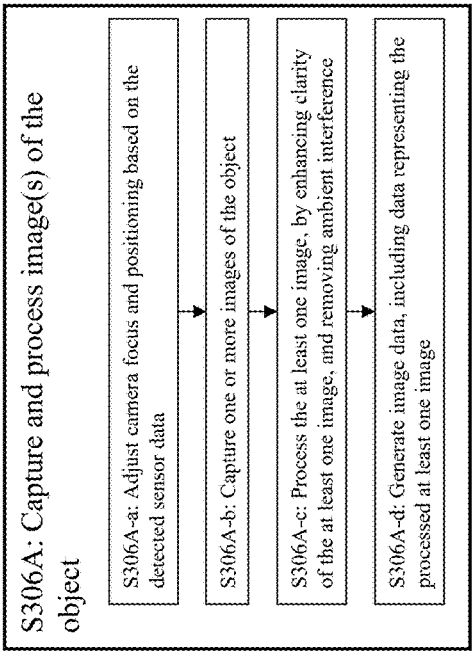

S306A: Capture and process image(s) of the object

S306A-a: Adjust camera focus and positioning based on the detected sensor data

S306A-b: Capture one or more images of the object

S306A-c: Process the at least one image, by enhancing clarity of the at least one image, and removing ambient interference S306A-d: Generate image data, including data representing the processed at least one image

FIG. 4B

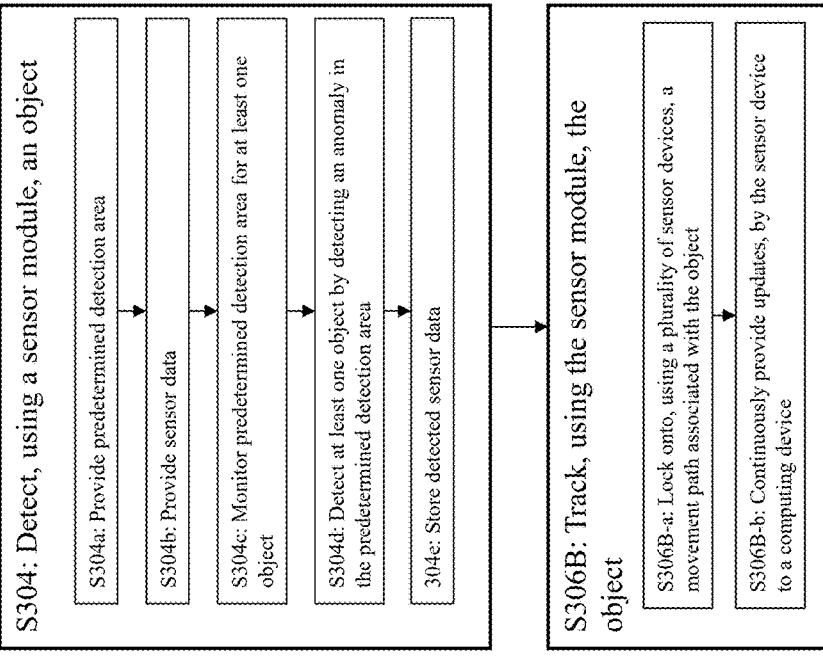

S304: Detect, using a sensor module, an object

S304a: Provide predetermined detection area

S304b: Provide sensor data

S304c: Monitor predetermined detection area for at least one object

S304d: Detect at least one object by detecting an anomaly in the predetermined detection area 304e: Store detected sensor data S306B: Track, using the sensor module, the object S306B-a: Lock onto, using a plurality of sensor devices, a movement path associated with the object S306B-b: Continuously provide updates, by the sensor device to a computing device

FIG. 4A

AERIAL DRONE INCAPACITATOR

FIELD

The present invention generally relates to systems, appa-ratuses, and methods for detecting, tracking, and intercept-ing aerial and ground-based objects. More specifically, it involves a system configured to capture or neutralize such objects using a net deployment mechanism, providing a controlled and non-destructive means of interception.

BACKGROUND

In recent times, the detection and interception of unau-thorized objects, such as drones in the air or autonomous vehicles on the ground, has become a subject of significant discussion, particularly in areas with restricted or sensitive access. Furthermore, non-lethal interception methods, such as net-based capture systems, are increasingly considered as safer alternatives to traditional projectile-based or electronic jamming methods.

There has also been considerable discussion around the development of mobile and portable interception systems, which can be deployed quickly and effectively in various environments. Current stationary interception systems often lack the flexibility needed for dynamic scenarios or remote locations, where unauthorized objects may appear unexpect-edly. A mobile or portable solution would allow for rapid deployment in response to emerging threats and provide greater adaptability across diverse and challenging environ-ments.

Accordingly, it would be beneficial to provide an appa-ratus and a system, that facilitates the safe, non-destructive interception of both aerial and ground-based objects, using advanced sensor technology and net deployment mecha-nisms in a mobile or portable configuration, enabling con-trolled and accurate capture across a variety of environ-ments.

SUMMARY

An object of the present invention is to address techno-logical and logistical challenges that currently exist in providing the safe and non-destructive interception of both aerial and ground-based objects, using advanced sensor technology and net deployment mechanisms in a mobile or portable configuration.

This and other objects shall be addressed in embodiments of the present invention as set forth herein.

In embodiments, a system for intercepting aerial objects, comprises: a plurality of sensor devices operatively con-nected via a network to a computing device, the plurality of sensor devices configured to: monitor for movement in a plurality of directions within a predetermined detection area, wherein the plurality of sensor devices are positioned to detect movement within the predetermined detection area; detect, within the predetermined area, movement associated with at least one object; generate first data, the first data comprising: a first speed of the at least one object; a first direction of the at least one object; and a first location of the at least one object; and provide, via the network to the computing device, the first data; wherein the plurality of sensor devices continuously monitor the at least one object within the predetermined detection area after providing the first data, wherein the plurality of sensor devices continu-ously monitor the at least one object, generating updated data, until at least one of the following: the at least one object is outside the predetermined detection area; the at least one object has been intercepted; or one or more instructions received by the computing device; wherein the plurality of sensor devices comprise first communication circuitry configured to communicate, via the network, with the computing device; a first camera, wherein the first camera is positioned to capture at least one image of the at least one object within the predetermined detection area and configured to: capture a first image, wherein the at least one object is depicted on the first image; generate second data comprising the first image; and provide, via the network to the computing device, the second data; wherein the first camera comprises second communication circuitry config-ured to communicate, via the network, with the computing device; a net launching device operatively connected, via the network, to the computing device and comprising: a net-launching mechanism configured to deploy a first net toward a calculated intercept point in response to receiving one or more instructions from the computing device, the calculated intercept point being calculated by the computing device and being based at least on data provided by the plurality of sensor devices and the computing device; a reloading cham-ber configured to store a plurality of netting; a reloading mechanism, mechanically coupled to the net-launching mechanism and the reloading chamber, the reloading mecha-nism is configured to provide one net from the plurality of netting from the reloading chamber to the net-launching mechanism such that the one net is positioned in a manner where the net-launching mechanism can deploy the one net; a swivel base configured to enable the net-launching mecha-nism to rotate along a pitch axis to adjust vertical positioning and a yaw axis to adjust horizontal positioning; a targeting mechanism operatively controlled by the computing device via the network, wherein the targeting mechanism is con-figured to aim the net-launching mechanism toward a cal-culated intercept point provided by the computing device; third communication circuitry configured to communicate, via the network, with the computing device; and the com-puting device configured to provide object data correspond-ing to a plurality of aerial objects, the object data including one or more of identifying characteristics comprising at least one of: dimensions, velocity, color, texture, thermal signa-ture, flight path, material composition, radar cross-section, magnetic signature, sound signature, shape, acceleration patterns, relative position in airspace, and optical signature, wherein the object data further comprises a predetermined aerial object list, including at least one predetermined aerial object, wherein the object data comprises one or more identifying characteristics of the at least one predetermined aerial object; receive the first data; generate first instructions, the first instructions being based at least on the first data; transmit, to the first camera via the network, the first instructions, such that upon receipt of the first instructions, the first camera captures the first image; receive, from the first camera via the network, the second data; generate third data via analysis of the second data, wherein the first image is compared to the object data for the purposes of identifi-cation of the at least one object depicted in the first image, and, wherein the third data includes information that indi-cates at least one finding associated with the analysis of the second data; analyze the updated data based on the object data, the first data, and the third data, to determine an intercept point where the intercept point is a point in space where the at least one object will collide with the first net once deployed by the net-launching device; generate fourth data based on the third data, and the analysis of the updated data, the third data including control instructions, wherein:

when the third data indicates that the at least one object corresponds to a predetermined aerial object of the at least one predetermined aerial objects, the control instructions comprise instructions for the net-launching device to deploy a net toward the calculated intercept point; when the at least one object corresponds to an object outside the at least one predetermined aerial objects, the control instructions comprise instructions for the sensor devices cease instructions to cease monitoring the at least one object; and transmit, via the network, the fourth data, wherein, when the third data indicates that the at least one object corresponds to a predetermined aerial object of the at least one predetermined aerial objects, the fourth data is transmitted to the net-launching device such that, upon receipt, the net-launching device deploys the first net at the calculated intercept point, and when the at least one object corresponds to an object outside the at least one predetermined aerial objects, the fourth data is transmitted to the plurality of sensor devices such that, upon receipt of the fourth data, the plurality of sensor devices cease monitoring the at least one object.

In embodiments, the network is a hard-wired network.

In embodiments, the network is a wireless network.

In embodiments, the network is a combination of a hard-wired network and a wireless network.

In embodiments, the plurality of sensor devices comprises: an inertial measurement unit configured to detect changes in the velocity within the predetermined detection area; detect changes in acceleration of objects within the predetermined detection area; and detect changes in orientation of objects within the predetermined detection area.

In embodiments, the plurality of sensor devices comprises: a RADAR sensor configured to detect a distance of objects within the predetermined detection area; detect a velocity of objects within the predetermined detection area; detect a direction of objects within the predetermined detection area; a GPS sensor configured to detect: a location of objects within the predetermined detection area; and an inertial measurement unit configured to detect changes in the velocity within the predetermined detection area; detect changes in acceleration of objects within the predetermined detection area; and detect changes in orientation of objects within the predetermined detection area. In embodiments the plurality of sensor devices further comprises: a LIDAR sensor configured to measure a distance of objects within the predetermined detection area; and measure a shape of objects within the predetermined detection area. In embodiments the plurality of sensor devices further comprises: an ultrasonic sensor configured to detect the range of objects within the predetermined detection area. In embodiments, the plurality of sensor devices further comprises: a weather sensor configured to measure environmental conditions, the environmental conditions comprise: wind speed; wind direction; air pressure; and precipitation. In embodiments, the plurality of sensor devices further comprises: a thermal sensor configured to detect heat signatures of objects within the predetermined detection area. In embodiments, the plurality of sensor devices further comprises: a time-of-flight sensor configured to calculate a distance from the net-launching device to objects within the predetermined detection area. In embodiments, the object data further comprises range data which indicates a maximum firing distance, and an optimal firing distance based on at least the following: angle data which indicates an angle at which the first net is deployed based on positioning of the net-launching mechanism along the pitch axis and the yaw axis; and weather data which indicates weather conditions comprising, air resistance, wind speed, wind direction, air pressure, and precipitation; and an elevation of the net-launching device, wherein the elevation is measured from the net-launching device to a base of the system, wherein the optimal firing distance is less than the maximum firing distance.

In embodiments, a device for intercepting aerial objects comprises: a plurality of sensor devices operatively connected to a computing device, the plurality of sensor devices configured to: monitor for movement in a plurality of directions within a predetermined detection area, wherein the plurality of sensor devices are positioned to detect movement within the predetermined detection area; detect, within the predetermined area, movement associated with at least one object; generate first data, the first data comprising: a first speed of the at least one object; a first direction of the at least one object; and a first location of the at least one object; and provide, to the computing device, the first data; wherein the plurality of sensor devices continuously monitor the at least one object within the predetermined detection area after providing the first data, wherein the plurality of sensor devices continuously monitor the at least one object, generating updated data, until at least one of the following: the at least one object is outside the predetermined detection area; the at least one object has been intercepted; or one or more instructions received by the computing device; wherein the plurality of sensor devices further comprises: a RADAR sensor configured to detect a distance of objects within the predetermined detection area; detect a velocity of objects within the predetermined detection area; detect a direction of objects within the predetermined detection area; a GPS sensor configured to detect a location of objects within the predetermined detection area; and an inertial measurement unit configured to detect changes in the velocity within the predetermined detection area; detect changes in acceleration of objects within the predetermined detection area; and detect changes in orientation of objects within the predetermined detection area; a first camera, wherein the first camera is positioned to capture at least one image of the at least one object within the predetermined detection area and configured to: capture a first image, wherein the at least one object is depicted on the first image; generate second data comprising the first image; and provide, to the computing device, the second data; a net launching device operatively connected to the computing device and comprising: a net-launching mechanism configured to deploy a first net toward a calculated intercept point in response to receiving one or more instructions from the computing device, the calculated intercept point being calculated by the computing device and being based at least on data provided by the plurality of sensor devices and the computing device; a reloading chamber configured to store a plurality of netting; a reloading mechanism, mechanically coupled to the net-launching mechanism and the reloading chamber, the reloading mechanism is configured to provide one net from the plurality of netting from the reloading chamber to the net-launching mechanism such that the one net is positioned in a manner where the net-launching mechanism can deploy the one net; a swivel base configured to enable the net-launching mechanism to rotate along a pitch axis to adjust vertical positioning and a yaw axis to adjust horizontal positioning; a targeting mechanism operatively controlled by the computing device, wherein the targeting mechanism is configured to aim the net-launching mechanism toward a calculated intercept point provided by the computing device; the computing device configured to provide object data corresponding to a plurality of aerial objects, the object data including one or more of identifying characteristics comprising at least one of: dimensions, velocity, color, texture, thermal signature, flight path, material composition, radar cross-section, magnetic signature, sound signature, shape, acceleration patterns, relative position in airspace, and optical signature, wherein the object data further comprises a predetermined aerial object list, including at least one predetermined aerial object, wherein the object data comprises one or more identifying characteristics of the at least one predetermined aerial object; receive the first data; generate first instructions, the first instructions being based at least on the first data; transmit, to the first camera, the first instructions, such that upon receipt of the first instructions, the first camera captures the first image; receive, from the first camera, the second data; generate third data via analysis of the second data, wherein the first image is compared to the object data for the purposes of identification of the at least one object depicted in the first image, and, wherein the third data includes information that indicates at least one finding associated with the analysis of the second data; analyze the updated data based on the object data, the first data, and the third data, to determine an intercept point; generate fourth data based on the third data, and the analysis of the updated data, the third data including control instructions, wherein: when the third data indicates that the at least one object corresponds to a predetermined aerial object of the at least one predetermined aerial objects, the control instructions comprise instructions for the net-launching device to deploy a net toward the calculated intercept point; when the at least one object corresponds to an object outside the at least one predetermined aerial objects, the control instructions comprise instructions for the sensor devices cease instructions to cease monitoring the at least one object; and transmit the fourth data, wherein, when the third data indicates that the at least one object corresponds to a predetermined aerial object of the at least one predetermined aerial objects, the fourth data is transmitted to the net-launching device such that, upon receipt, the net-launching device deploys the first net at the calculated intercept point, and when the at least one object corresponds to an object outside the at least one predetermined aerial objects, the fourth data is transmitted to the plurality of sensor devices such that, upon receipt of the fourth data, the plurality of sensor devices cease monitoring the at least one object. In embodiments the plurality of sensor devices further comprises: a LIDAR sensor configured to measure a distance of objects within the predetermined detection area; and measure a shape of objects within the predetermined detection area.

In embodiments, the plurality of sensor devices further comprises: an ultrasonic sensor configured to detect the range of objects within the predetermined detection area.

In embodiments, the plurality of sensor devices further comprises: a weather sensor configured to measure environmental conditions, the environmental conditions comprising: wind speed; wind direction; air pressure; and precipitation.

In embodiments, the plurality of sensor devices further comprises: a thermal sensor configured to detect heat signatures of objects within the predetermined detection area.

In embodiments, the plurality of sensor devices further comprises: a time-of-flight sensor configured to calculate a distance from the net-launching device to objects within the predetermined detection area In embodiments, the object data further comprises range data which indicates a maximum firing distance, and an optimal firing distance based on at least the following: angle data which indicates an angle at which the first net is deployed based on positioning of the net-launching mechanism along the pitch axis and the yaw axis; and weather data which indicates weather conditions comprising, air resistance, wind speed, wind direction, air pressure, and precipitation; and an elevation of the net-launching device, wherein the elevation is measured from the net-launching device to a base of the system, wherein the optimal firing distance is less than the maximum firing distance.

In embodiments, the device further comprises: a power supply comprising at least one solar panel; and an energy storage unit configured to store electrical energy, the stored electrical energy comprising energy generated by the power supply.

BRIEF DESCRIPTION OF THE DRAWINGS

Exemplary embodiments of the present invention will be described with reference to the accompanying figures, wherein:

FIG. 4A is a flow chart illustrating an exemplary embodiment of steps S304 and S306B of FIG. 3A, in accordance with exemplary embodiments of the present invention;

FIG. 4B is a flow chart illustrating an exemplary embodiment of step S306A of FIG. 3A, in accordance with exemplary embodiments of the present invention;

DETAILED DESCRIPTION

Figure 1:
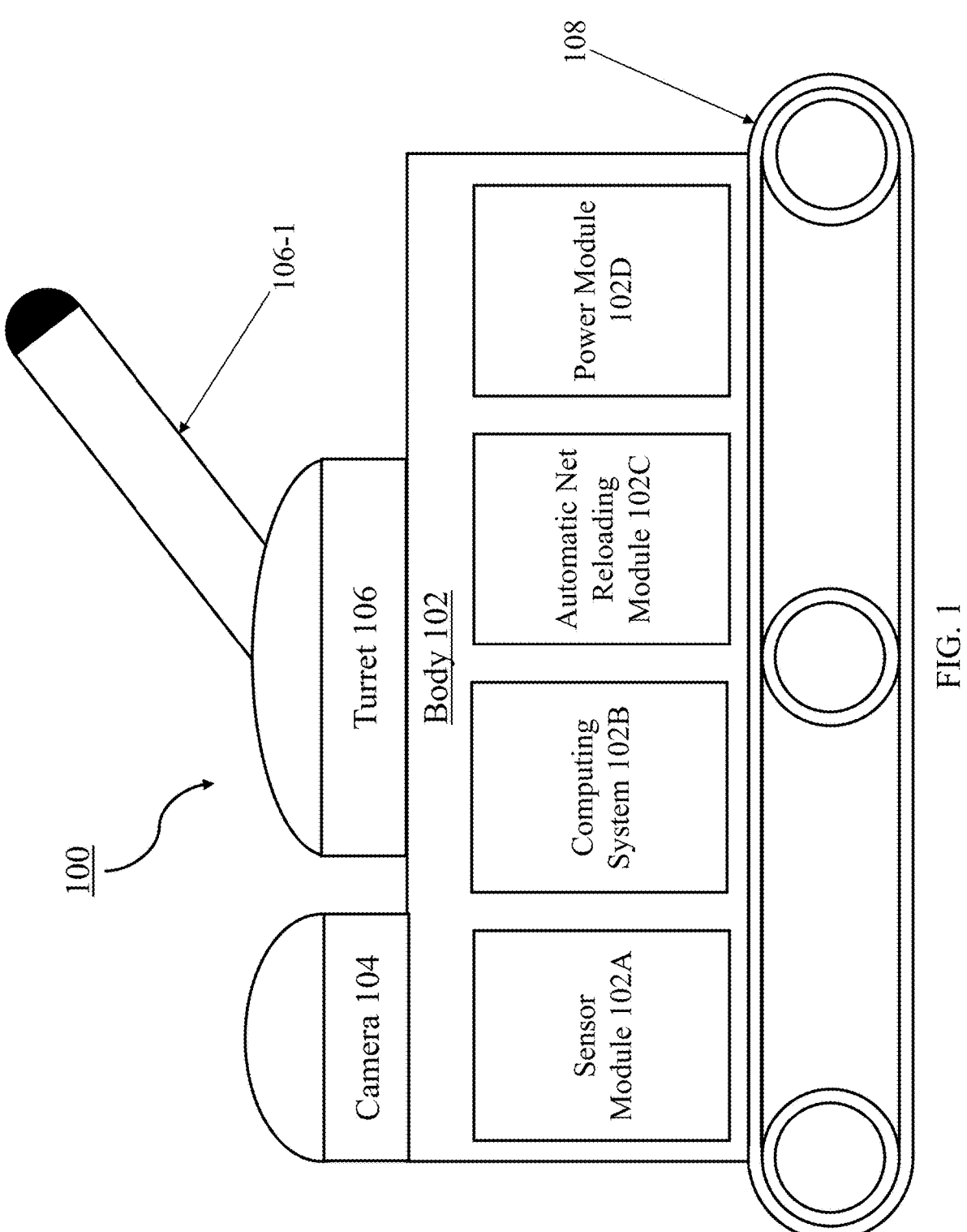
FIG. 1 is a schematic diagram of a system for detecting, tracking, and intercepting aerial and ground-based objects, in accordance with exemplary embodiments of the present invention.

The present invention generally relates to systems, apparatuses, and methods for detecting, tracking, and intercepting aerial and ground-based objects. More specifically, it involves a system configured to capture or neutralize such objects using a net deployment mechanism, providing a controlled and non-destructive means of interception.

Objects, as used throughout the present inventions description, may refer to any ground-based or aerial object capable of being operatively neutralized by a deployed net, such as unmanned aerial vehicles (UAVs) including commercial drones, hobbyist drones, and remote-controlled aerial devices commonly used for recreational or commercial photography and surveillance, to name a few. Aerial objects may also encompass balloons, kites, and small aircraft, to name a few, that may enter restricted airspace unintentionally or otherwise. On the ground, for example, objects may include autonomous vehicles, such as delivery robots or inspection rovers, as well as remotely controlled ground-based devices used for reconnaissance or monitoring in sensitive areas. Other ground-based objects may include small robotic devices, rolling surveillance units, and mobile equipment in need of temporary immobilization, to name a few. Each of these objects, whether airborne or ground-based, in embodiments, can be effectively intercepted and rendered effectively inoperable or contained by the system's net deployment, thereby preventing further movement or access within a protected area.

Effectively inoperable, as used herein and throughout this description, refers to a state in which an object's movement, functionality, or intended operation is sufficiently restricted, hindered, or immobilized such that it can no longer perform its primary functions or continue its trajectory as initially intended. This may include scenarios where the object is physically restrained, its control systems are disrupted, or its mobility is impaired, thereby preventing it from completing its designated tasks or accessing restricted areas.

Predetermined detection area, as used herein and throughout this description, refers to a specified spatial region (hereinafter "detection area") in which System 100 actively monitors, detects, and potentially intercepts objects. In embodiments, the detection area may be set by operators through inputting coordinates, boundary markers, or dimensional parameters into System 100. In embodiments, the detection area may be set automatically by System 100, adjusting dynamically based on a variety of factors, including the capabilities and limitations of Sensor Module 102A, sensor readings such as weather conditions, and the range of Turret 106's net deployment mechanism.

This detection area may cover different types of environments, such as airspace over restricted zones, ground areas surrounding sensitive locations, or combined aerial and ground perimeters, depending on operational needs. The scope of the detection area may vary based on the range, resolution, and field of view of individual sensors, such as RADAR, LIDAR, infrared, and ultrasonic sensors. For instance, higher-range sensors may allow for a larger detection area, while lower-range sensors may define a more confined detection area (e.g., to ensure accuracy and responsiveness). Likewise, environmental factors that affect sensor readings, such as fog, rain, or wind, may influence the detection area boundaries, with real-time adjustments being made as conditions change.

Furthermore, the power of Turret 106's net deployment mechanism may impact the size of the Detection Area, as higher-powered deployments enable an extended reach for interception within the Detection Area. By accommodating sensor capabilities, environmental conditions, and deployment power, System 100's detection area can be tailored to suit specific operational requirements, offering flexible and adaptable monitoring and interception coverage across various scenarios. A more detailed description of System 100, its components, and associated methods is below in the descriptions associated with FIGS. 1-4F, the descriptions of which applying herein.

The present invention described herein pertains to the field of non-lethal interception systems and devices, specifically directed toward the safe detection, tracking, and neutralization of unauthorized objects within restricted spaces—both in the air and on the ground. Situated within the broader domain of security and surveillance technology, the present invention addresses the growing need for controlled interception solutions that minimize risks and collateral damage associated with traditional projectile or jamming-based countermeasures. This invention is highly relevant to both aerial and ground-based security applications, offering a precise and non-destructive method for intercepting objects through net deployment. Its utility extends across multiple fields, including security for airports, military facilities, and private properties, as well as applications requiring mobile and adaptable response capabilities.

Furthermore, this invention finds its significance in the area of mobile and portable security systems, with a focus on rapid deployment and adaptability to diverse environments. The invention's configuration allows for both stationary and mobile deployment, enabling flexible response to emerging threats across various settings. This adaptability is especially relevant in dynamic security scenarios, where conventional fixed-location systems may lack the responsiveness or versatility required. By providing a transportable solution, the invention enables a proactive approach to security management, meeting a critical need for efficient, portable interception systems that can secure both temporary and permanent locations.

The present invention integrates advancements from the fields of sensor technology, real-time data processing, and non-lethal interception mechanics. With its sensor and computational capabilities, the present invention leverages multi-modal detection and tracking methodologies to ensure reliable and precise operation. The invention's design reflects a user-centric approach, aimed at maximizing operational effectiveness while reducing potential collateral impact. The result is an innovative solution that seamlessly combines security with safety, addressing the challenges of modern aerial and ground-based interception with a sophisticated, net-based deployment mechanism.

This invention, comprising an automated net-launching device, a plurality of sensors, and a computing system, represents a significant step forward in the field of non-lethal interception technology. The apparatus is configured to detect and engage unauthorized objects within a specified perimeter, including both aerial and ground-based threats. Through the integration of real-time data analysis and precise targeting, the present invention achieves reliable interception in a controlled, non-damaging manner. The modularity of its design enables the invention to be adapted for a range of applications, from permanent installations to mobile, rapidly deployable units, providing a novel solution for security and protection.

By addressing the need for a flexible, safe, and effective interception system, the present invention introduces a range of novel and non-obvious features that significantly enhance security operations in restricted areas. This system, with its user-friendly deployment and adaptable configurations, offers an innovative, effective, and safer alternative to conventional interception technologies. The invention serves a wide array of users, including law enforcement, military personnel, and private security firms, positioning itself as a key advancement in the field of non-lethal security solutions for diverse and evolving security challenges.

Referring to FIG. 1, in embodiments, a System 100, configured for detecting and intercepting objects with netting, is depicted. System 100, in embodiments, is configured for detecting and intercepting aerial and ground-based objects using a net deployment mechanism. In embodiments, System 100 provides a non-lethal solution for tracking, identifying, and intercepting unauthorized or potentially hazardous objects, such as drones, within a predetermined airspace. System 100 is configured to utilize various sensors (i.e., via Sensor Module 102A), imaging devices, and a computing module to detect, monitor, and capture objects by deploying a net, thereby reducing risks associated with projectile-based interception methods.

System 100 is designed with robust, high-strength materials to ensure durability and resilience in various environmental conditions, including exposure to extreme temperatures, moisture, and physical impact. Key components, such as the Net Storage Chamber 102C, Power Module 102D, and Sensor Module 102A, are encased in weather-resistant housings to protect internal mechanisms from corrosion, dust, and debris. Additionally, System 100's structural framework may incorporate reinforced joints and shock-absorbing mounts, allowing it to withstand vibrations, sudden movements, and operational stresses without compromising operational performance.

System 100 is designed with flexibility in size and weight to adapt to various deployment scenarios, allowing it to be utilized as a ground unit or mounted on mobile platforms, such as the back of a pickup truck. The overall dimensions and weight of System 100 can be adjusted based on situational requirements, with lighter, compact configurations available for rapid deployment and larger, more comprehensive setups for extended monitoring and interception needs. Each module within the system is optimized for space efficiency, ensuring that components can be rearranged or scaled to suit specific operational environments without compromising functionality.

System 100, in embodiments, may include Body 102, Camera 104, Turret 106, and Tracked Mobility Base 108. Body 102, in embodiments, may include Sensor Module 102A, Computing System 102B, Automatic Net Reloading Module 102C, and Power Module 102D. A more detailed description of Body 102 is described in connection with FIG. 2A.

Figure 2A:
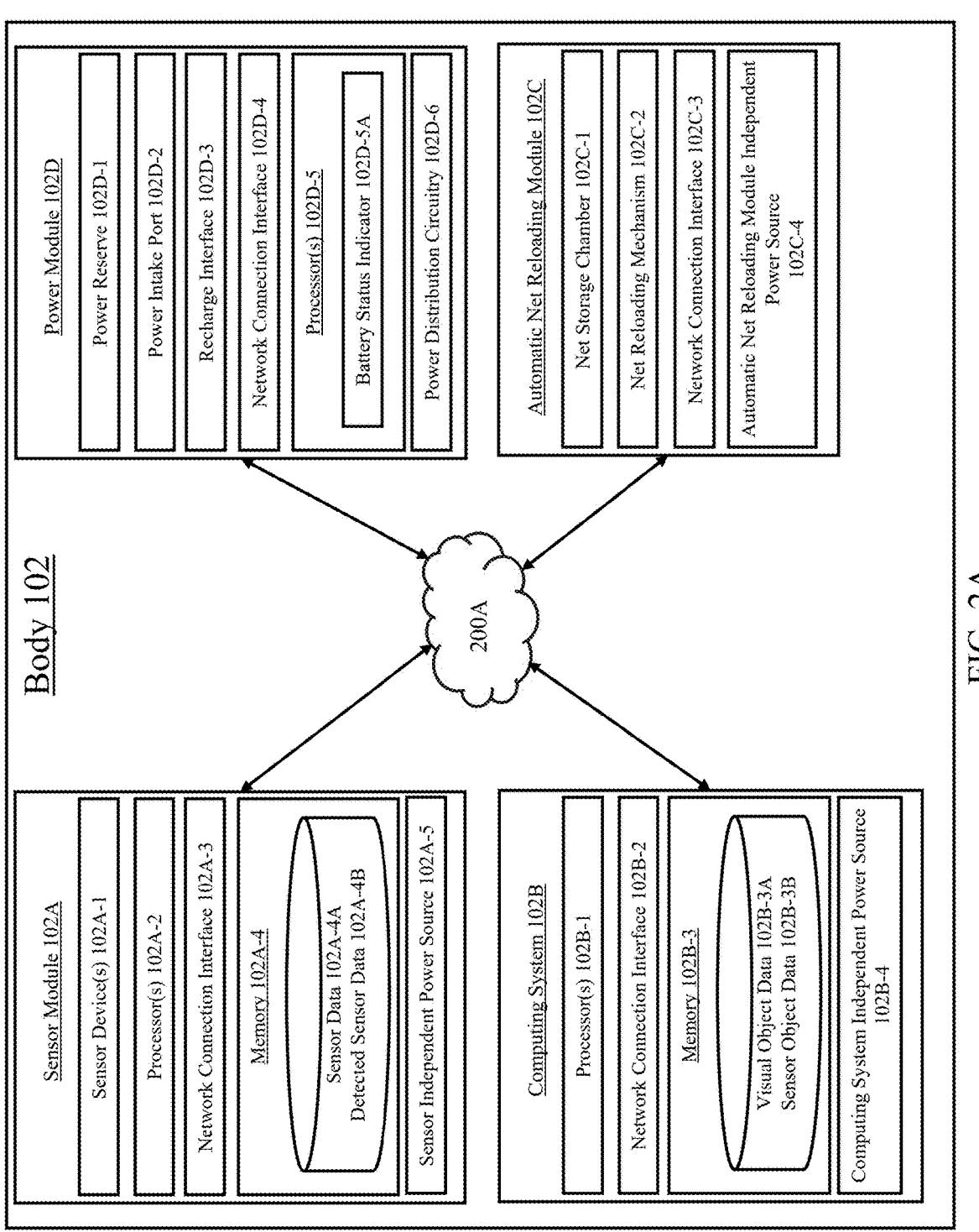
FIG. 2A is a schematic diagram of a body of the system depicted in FIG. 1, in accordance with exemplary embodiments of the present invention.

Referring to FIG. 2A, Sensor Module 102A, Computing System 102B, Automatic Net Reloading Module 102C, and Power Module 102D may be operatively connected via Network 200A. Network 200A, in embodiments, may be a hard-wired connection between each of the Sensor Module 102A, Computing System 102B, Automatic Net Reloading Module 102C, and Power Module 102D. Network 200A, in embodiments, may be a wireless connection between each of the Sensor Module 102A, Computing System 102B, Automatic Net Reloading Module 102C, and Power Module 102D. Network 200A, in embodiments, may include more than one network, and, in embodiments, may be a combination of a wireless and hard-wired connection between each of the Sensor Module 102A, Computing System 102B, Automatic Net Reloading Module 102C, and Power Module 102D. For example, the Power Module 102D may be hardwired to Computing System 102B while Sensor Module 102A, Computing System 102B, and Automatic Net Reloading Module 102C communicate via a wireless network. As another example, Sensor Module 102A, Computing System 102B, Automatic Net Reloading Module 102C may be operatively connected both wirelessly and via a hard-wired connection to create a redundancy.

As depicted in FIG. 2A, Sensor Module 102A, in embodiments, may include Sensor Device(s) 102A-1, Processor(s) 102A-2, Network Connection Interface 102A-3, Memory 102A-4, and Sensor Independent Power Source 102A-5. These components enable Sensor Module 102A to detect and gather data on objects within a designated area, process and transmit this data to other components within System 100, securely store relevant sensor information, and operate independently of external power sources, ensuring uninterrupted monitoring and data collection capabilities.

Sensor Device(s) 102A-1 (hereinafter Sensor Device 102A-1) may include one or more sensors capable of detecting various attributes and characteristics of objects within a predetermined detection area. In some embodiments, Sensor Device 102A-1 may include, but not limited to, RADAR sensors for long-range detection, LIDAR sensors for precise distance measurement, and infrared (IR) sensors for detecting heat signatures. These sensors allow System 100 to identify, track, and capture detailed data on objects, providing foundational data for subsequent processing and analysis.

In some embodiments, Sensor Device 102A-1 may include ultrasonic sensors for proximity detection and time-of-flight (ToF) sensors for accurate distance calculation based on light pulse reflections. Sensor Device 102A-1 may further include environmental sensors, such as barometric pressure, humidity, and temperature sensors, allowing System 100 to adapt its detection sensitivity based on environmental factors that could impact sensor accuracy. These sensors enable the system to calibrate and adjust readings as needed for optimal operation across different environmental conditions.

Additionally, Sensor Device 102A-1 may include GPS sensors to provide precise location data of objects within the detection area and inertial measurement units (IMUs) to capture acceleration, orientation, and movement patterns. The combination of GPS and IMU data allows for comprehensive tracking of objects in both stationary and dynamic environments. In further embodiments, Sensor Device 102A-1 may include magnetometers to detect magnetic fields, which can assist in identifying objects with specific magnetic properties or enhance orientation tracking.

Each of the Sensor Device 102A-1 may be configured to transmit data to Processor 102A-2 in real time, facilitating continuous and precise monitoring of objects within the detection area. The data gathered by Sensor Device 102A-1 may include raw measurements (e.g., distance, speed, angle) as well as processed attributes (e.g., object size, trajectory), supporting System 100's objective to detect, classify, and intercept objects effectively.

Sensor Device 102A-1, in embodiments, may include a wide range of sensors, each offering specialized capabilities that enhance the detection, tracking, and interception functions of System 100. For example, ultrasonic sensors may be included to determine the distance and proximity of objects by emitting sound waves and analyzing their reflections, providing reliable short-range detection across diverse environmental conditions. Additionally, infrared (IR) sensors may be incorporated to detect objects based on emitted or reflected infrared radiation, which enables effective movement and position tracking, particularly in low-light or nighttime conditions. LIDAR (Light Detection and Ranging) sensors may also be used to create precise, three-dimensional maps of object positions by emitting laser pulses and analyzing reflections, allowing for highly accurate tracking, especially of drones and other aerial objects in complex environments.

To support long-range detection and tracking, RADAR sensors may be configured within Sensor Device 102A-1 to transmit radio waves and capture reflections from distant objects, providing effective monitoring even in adverse weather conditions such as rain or fog. Additionally, Inertial Measurement Units (IMUs), which include accelerometers and gyroscopes, may be implemented to monitor movement, orientation, and velocity, helping to stabilize and orient System 100 accurately in response to the motion of detected objects or System 100 itself. Optical flow sensors may further enhance tracking capabilities by detecting relative motion between System 100 and the object through changes in light patterns, providing valuable information on object velocity and direction. Time-of-Flight (ToF) sensors may also be included to measure the time it takes for light pulses to travel to an object and back, yielding precise distance measurements that support real-time range detection.

In scenarios requiring thermal detection, thermal imaging sensors may be used to visualize heat signatures, helping to identify objects based on temperature differences, which is particularly useful in environments with low visibility. Additionally, magnetometer sensors may be employed to detect magnetic fields, aiding in determining object orientation or tracking magnetic objects in environments where magnetic mapping is relevant. For environmental data collection, weather sensors may be incorporated to measure wind speed, direction, air pressure, temperature, and precipitation, allowing System 100 to adjust interception calculations based on real-time weather conditions.

Other sensors, such as acoustic sensors, may capture sound waves and analyze acoustic signatures to identify objects based on unique sound patterns, such as drone propellers. GPS sensors may provide precise location data for both System 100 and detected objects, which, in combination with barometric pressure sensors to monitor altitude changes, support effective tracking in three-dimensional space. In certain implementations, vibration sensors may be used to detect mechanical disturbances, verifying object presence in proximity. Laser rangefinders may offer high-accuracy distance measurements that are particularly useful in intercept calculations. Additionally, proximity sensors can detect nearby objects without contact, and electro-optical sensors provide high-resolution images for enhanced visual analysis. Other sensor types, such as gyroscopic sensors within IMUs and humidity sensors, may also contribute to System 100's overall functionality by refining orientation data and providing relevant environmental context.

By selectively integrating various combinations of sensors, System 100 can adapt to a range of environmental conditions and detection requirements. For instance, a combination of RADAR, LIDAR, and weather sensors may be ideal for variable weather conditions, ensuring precise tracking even in fog or rain. Alternatively, an infrared sensor combined with optical flow and ToF sensors may optimize close-range interception in low-light environments, while a setup with thermal imaging, GPS, and IMU sensors could be suited for tracking multiple objects within a crowded airspace, such as near airports or secure facilities. Each sensor configuration provides unique capabilities that enhance System 100's adaptability and precision, ensuring effective operation in diverse and dynamic scenarios.

Sensor Module 102A may include one or more Processor(s) 102A-2 (hereinafter "Processor 102A-2"). Processor 102A-2 may include any suitable processing circuitry capable of controlling operations and functionality of Sensor Module 102A, as well as facilitating communications between one or more of the various components within System 100. In some embodiments, Processor 102A-2 may include a central processing unit (CPU), a graphics processing unit (GPU), one or more microprocessors, a digital signal processor (DSP), or any other type of processor, or any combination thereof. In more advanced configurations, the Processor 102A-2 may be a multi-core processor or a neural processing unit (NPU), which provides specialized processing power for machine learning tasks and accelerates AI-driven applications.

The functionality of Processor 102A-2 may also be performed by one or more hardware logic components including, but not limited to, field-programmable gate arrays (FPGAs), application-specific integrated circuits (ASICs), application-specific standard products (ASSPs), system-on-chip systems (SoCs), and/or complex programmable logic devices (CPLDs). Each of these components can offer specialized processing capabilities, allowing Sensor Module 102A to perform complex, high-speed computations efficiently.

Furthermore, Processor 102A-2 may include its own local memory, which may store program systems, program data, and/or one or more operating systems (OS). Processor 102A-2 may execute a full OS for Sensor Module 102A, as well as firmware, middleware, and application software necessary for Sensor Device 102A-1 operation. In some embodiments, Processor 102A-2 may also execute containerized applications or microservices, facilitating modular and scalable software deployment. Additionally, for web-based applications, Processor 102A-2 may run local scripts for reading and rendering content received from one or more remote servers or cloud services. For example, Processor 102A-2 may execute JavaScript or WebAssembly to render HTML or XHTML content dynamically received from a URL accessed by Sensor Module 102A.

Sensor Module 102A, in embodiments, may further include Network Connection Interface 102A-3. In embodiments, Network Connection Interface 102A-3 may include any suitable communication interface configured to facilitate data exchange between Sensor Module 102A and one or more other components within System 100, as well as external devices or remote servers, in some embodiments. Network Connection Interface 102A-3, in embodiments, may support both wired and wireless communication protocols, such as Ethernet, Wi-Fi, Bluetooth, or cellular connections, to enable flexible and reliable data transmission. This interface allows Sensor Module 102A to transmit real-time sensor data, including detection variables and refined object profiles, to Computing System 102B for processing and decision-making. Network Connection Interface 102A-3 may also include support for secure communication protocols, such as Transport Layer Security (TLS) or Virtual Private Networks (VPNs), ensuring data integrity and confidentiality when transmitting sensitive information. Additionally, Network Connection Interface 102A-3 may allow remote configuration and monitoring of Sensor Device(s) 102A-1, enabling remote updates, diagnostics, and calibration as necessary for optimal performance.

Sensor Module 102A, in embodiments, may further include Memory 102A-4, which may consist of one or more types of storage mediums, such as volatile or non-volatile memory, or removable or non-removable storage implemented in any suitable manner to store data for Sensor Module 102A. Examples of storage types include, but are not limited to, hard disk drives (HIDDs), solid-state drives (SSDs), flash memory, read-only memory (ROM), electronically erasable programmable read-only memory (EEPROM), optical storage such as CD-ROM or digital versatile disk (DVD), magnetic storage such as cassettes or tapes, RAID arrays, and network-attached storage (NAS) systems, to name a few. Additionally, Memory 102A-4 may include more modern storage solutions such as non-volatile memory express (NVMe) SSDs for faster data access.

Memory 102A-4 may be implemented as computer-readable storage media (CRSM), encompassing any available physical media accessible by Processor 102A-2 to execute one or more instructions stored within Memory 102A-4. In some embodiments, this may include cloud-based or hybrid storage options to support extended data management capabilities for remote or high-volume data processing. Memory 102A-4 may be configured with encrypted storage and secure memory partitions to protect sensitive data during processing, ensuring the confidentiality and integrity of both real-time and stored sensor data. Additionally, Memory 102A-4 may leverage local and remote storage for efficient data retrieval and long-term retention of, for example, operational logs, sensor readings, and object classification data, to name a few.

In embodiments, Memory 102A-4 may store various types of data associated with System 100's operation. The sensor module's memory may be responsible for storing various types of data essential to the system's operation. For example, Memory 102A-4 may include Sensor Data 102A-4. In embodiments, Sensor Data 102A-4 may include data profiles for one or more objects System 100 is configured to detect, such as drones, vehicles, or wildlife. Each profile may include one or more predetermined characteristics, such as, for example, size, shape, velocity ranges, acceleration ranges, thermal signatures, infrared signatures, flight paths, and movement patterns, to name a few In embodiments, the predetermined characteristics are based on what Sensor Device 102A-1 can detect. In embodiments, data profiles may be updated or added to adapt to changing security needs, enhancing System 100's responsiveness to different types of objects or operational scenarios. In embodiments, Memory 102A-4 is configured for dynamic updating of object data profiles to enable System 100 to adapt to evolving or new objects over time, updated detection criteria are saved to Memory 102A-4.

In embodiments, Memory 102A-4 may include variables based on the types of data each Sensor Device 102A-1 can detect. Detection variables, in embodiments, provide context for each Sensor Device 102A-1's readings. For example, the detection variables may include distance and proximity ranges. Continuing the example, for sensors like LIDAR, RADAR, or ultrasonic sensors, Memory 102A-4 may store optimal detection ranges and limitations, enabling System 100 system to prioritize data within effective ranges. As another example, the detection variables may include angle of detection which may define the angle of coverage for each Sensor Device 102A-1, improving tracking and position calculations for Computing System 102B. As yet another example, detection variables may include environmental thresholds which may enable Sensor Module 102A to adjust the sensitivity of sensors affected by environmental conditions (e.g., optical sensors in low light conditions).

In embodiments, Memory 102A-4 may include Detected Sensor Data 102A-4B. In embodiments, Detected Sensor Data 102A-4B may include raw readings and initial measurements for Sensor Device 102A-1. Additionally, in embodiments, Detected Sensor Data 102A-4B may include environmental information such as wind speed, air pressure, and humidity, to name a few. Detected Sensor Data 102A-4B may further include processed and verified data (e.g., data that can be utilized by the Computing System 102B). The processed and verified data may include refined characteristics of detected objects, such as precise location, current trajectory, acceleration, and distinguishing features like size, shape, or movement patterns. Detected Sensor Data 102A-4B may also incorporate cross-referenced data from multiple sensors, creating a comprehensive profile of each detected object. In embodiments, Detected Sensor Data 102A-4B is updated in real time as objects move through the detection area, providing a continuously accurate representation of objects for tracking and analysis by Computing System 102B. In embodiments, Memory 102A-4 may include variables for confidence thresholds (e.g., match percentage to a known profile), which can ensure that objects are accurately identified before System 100 initiates further actions like interception.

In embodiments, Memory 102A-4 may facilitate real-time cross-referencing of variables across multiple sensors of Sensor Device 102A-1 by Computing System 102B. For example, Memory 102A-4 can store criteria for combining data from RADAR (for range) and infrared (for heat signatures) to confirm an object's classification.

In embodiments, Memory 102A-4 may include historical detection data for each identified object, which may enable Sensor Module 102A to recognize repeat objects or refine variables based on previous interactions. In embodiments, Memory 102A-4 may store data related to anomalous behaviors or movement patterns, identifying objects that deviate from normal paths, speeds, or other expected characteristics. Data related to anomalies, in embodiments, can be cross-referenced against historical data stored in memory to detect recurring patterns or trends that might signal a potential threat.

In embodiments, Memory 102A-4 may include an operation log, which may include calibration adjustments (e.g., in response to environmental changes or hardware updates).

In embodiments, Sensor Module 102A may include Sensor Independent Power Source 102A-5. In embodiments, Sensor Independent Power Source 102A-5 may provide an autonomous power supply for Sensor Module 102A, enabling continuous operation even in the absence of a direct connection to System 100's primary power supply (Power Module 102D). In embodiments, Sensor Independent Power Source 102A-5 may include rechargeable batteries, fuel cells, or supercapacitors capable of sustaining sensor functionality for extended periods, supporting mobile or portable deployments where fixed power sources are not available. This independent power source may, in embodiments, also incorporate energy-harvesting technologies, such as solar panels or kinetic energy converters, enabling Sensor Module 102A to recharge or extend battery life based on environmental conditions. Sensor Independent Power Source 102A-5 may further include power management circuitry to monitor energy levels, optimize power usage, and control charging cycles, ensuring reliable sensor operation over time. Sensor Independent Power Source 102A-5, in embodiments, is configured such that Sensor Module 102A remains operational in various field conditions, enhancing System 100's overall resilience and adaptability.

As depicted in FIG. 2A, Computing System 102B, in embodiments, may include Processor(s) 102B-1, Network Connection Interface 102B-2, Memory 102B-3, and Computing System Independent Power Source 102B-4. These components enable Computing System 102B to process data received from Sensor Module 102A, data received from Camera 104, manage communication within System 100, store and retrieve critical operational data, and operate independently of external power sources, ensuring continuous functionality and control over System 100's operations.

Processor(s) 102B-1 (hereinafter "Processor 102B-1"), in embodiments, may include any suitable processing circuitry configured to control and manage the operations of Computing System 102B, enabling it to process data from Sensor Module 102A, Automatic Net Reloading Module 102C, Power Module 102D, Camera 104, and Turret 106, make decisions based on received data, and coordinate interception actions within System 100. In some embodiments, Processor 102B-1 may include a central processing unit (CPU), a graphics processing unit (GPU), one or more microprocessors, a digital signal processor (DSP), or a neural processing unit (NPU), which collectively or independently provide the computational power needed for intensive data analysis, real-time tracking, and predictive modeling. Additionally, Processor 102B-1, in embodiments, may leverage multi-core configurations or parallel processing capabilities to handle multiple data streams simultaneously, ensuring continuous and seamless operation of System 100 in dynamic environments.

The functionality of Processor 102B-1 may, in embodiments include one or more hardware logic components, including but not limited to field-programmable gate arrays (FPGAs), application-specific integrated circuits (ASICs), application-specific standard products (ASSPs), system-on-chip systems (SoCs), and/or complex programmable logic devices (CPLDs), to name a few. These components may support specific functionalities, such as high-speed data acquisition from Sensor Module 102A and Camera 104, rapid decision-making algorithms, or specialized tasks, including machine learning inference and object classification. This specialized hardware enables Computing System 102B to efficiently process large volumes of data, perform rapid calculations, and issue timely commands to other components within System 100.

In embodiments, Processor 102B-1 may include local memory for storing essential programs, data structures, and operational instructions required for System 100 to function optimally. This local memory may house pre-defined algorithms for object detection, identification, trajectory prediction, and intercept point calculation, as well as secure memory partitions for storing critical system parameters and sensor calibration data. Processor 102B-1, in embodiments, may execute both an operating system (OS) and application-level software that facilitate real-time data integration from Sensor Module 102A and Camera 104, interpret the data, and determine appropriate response actions based on defined protocols. In some embodiments, Processor 102B-1 may also run machine learning models and perform neural network inference to enhance the accuracy of object classification and tracking, ensuring that System 100 remains adaptive to new or evolving threat profiles.

In embodiments, Processor 102B-1 executes the computational tasks necessary to control System 100, including but not limited to, interpreting real-time data from various sensors and cameras, calculating interception points, and issuing commands to positioning and deployment mechanisms based on sensor feedback. Processor 102B-1 may also manage communication with remote systems, facilitating real-time monitoring, software updates, and configuration changes as needed.

In embodiments, Processor 102B-1 may be similar to Processor 102A-2 described in connection with FIG. 2B, the description of which applying herein.

Computing System 102B, in embodiments, may include Network Connection Interface 102B-2. Network Connection Interface 102B-2, in embodiments, may facilitate communication between Computing System 102B and other components within System 100, as well as external systems, devices, or networks, depending on the configuration and deployment environment. In some embodiments, Network Connection Interface 102B-2 may support both wired and wireless communication protocols, such as Ethernet, Wi-Fi, Bluetooth, or cellular connections, allowing for flexible and reliable data transmission. Network Connection Interface 102B-2 may enable Computing System 102B to transmit real-time object data, system status information, and command signals to remote control centers or monitoring devices. Furthermore, Network Connection Interface 102B-2 may support secure communication protocols, such as Transport Layer Security (TLS) or Virtual Private Networks (VPNs), to ensure data integrity and confidentiality when handling sensitive information. Additionally, Network Connection Interface 102B-2 may allow remote access for system diagnostics, firmware updates, or configuration adjustments, enhancing the maintainability and operational flexibility of System 100.

In embodiments, Network Connection Interface 102B-2 may be similar to Network Connection Interface 102A-3 described in connection with FIG. 2B, the description of which applying herein.

Computing system 102B, in embodiments, may include Memory 102B-3. Memory 102B-3, in embodiments, may include of one or more types of storage media, such as volatile memory, non-volatile memory, or a combination thereof, implemented to securely store data required for the operation of Computing System 102B. Memory 102B-3, in some embodiments, may include Visual Object Data 102B-3A (e.g., data received from Camera 104) and Sensor Object Data 102B-3B (e.g., data received from Sensor Module 102A). Visual Object Data 102B-3A may include data received from Camera 104, such as high-resolution images or video frames capturing object details, movement patterns, and visual characteristics that contribute to object identification and classification, to name a few. Visual Object Data 102B-3A may be processed (e.g., by Processor 102B-1) to enhance clarity, remove noise, and identify key visual markers, enabling Computing System 102B to classify and track objects effectively within the detection area.

Sensor Object Data 102B-3B may include data received from Sensor Module 102A, encompassing a variety of sensor measurements (e.g., Detected Sensor Data 102A-4B), such as RADAR, LIDAR, and infrared readings, as well as environmental data from weather or barometric sensors. This data may provide Computing System 102B with multidimensional information about object distance, velocity, acceleration, thermal signatures, and environmental conditions, enabling comprehensive analysis and tracking of each detected object. Memory 102B-3 may also include historical object profiles, anomaly data, and detection thresholds to support real-time cross-referencing and validation of Visual Object Data 102B-3A and Sensor Object Data 102B-3B. Additionally, in some embodiments, Memory 102B-3 may store machine learning models, object classification algorithms, and trajectory prediction formulas, enabling Computing System 102B to refine object identification accuracy and interception timing based on both visual and sensor data inputs.

Memory 102B-3, in embodiments, may include various types of data essential to the functionality of Computing System 102B and the overall operation of System 100. The various types of data, in embodiments, may include object profiles comprising predetermined characteristics for various objects that System 100 is designed to detect, such as drones, vehicles, or wildlife. Each profile may contain attributes like size, shape, velocity and acceleration ranges, thermal and infrared signatures, typical flight paths or movement patterns, and other distinguishing features. These profiles enable Computing System 102B to accurately classify and differentiate objects within the detection area based on the data received from both Visual Object Data 102B-3A and Sensor Object Data 102B-3B.

In embodiments, Memory 102B-3 may store detection variables that provide context for each type of sensor data, such as optimal detection ranges, angle of coverage, and environmental thresholds for sensors affected by conditions like low light or high humidity. Memory 102B-3, in embodiments, may also maintain historical detection data to identify repeat objects or refine detection criteria based on prior interactions, enhancing the system's adaptability over time.

Furthermore, in embodiments, Memory 102B-3 may include anomaly data related to unexpected movement patterns or behaviors, allowing Computing System 102B to detect objects that deviate from typical profiles. This data may be cross-referenced with both real-time and historical data to help identify potential threats or unusual objects. Additionally, in embodiments, Memory 102B-3 may store machine learning models and object classification algorithms that support dynamic updating of detection criteria, allowing System 100 to respond to evolving conditions or the appearance of new object types by saving updated profiles and criteria directly to memory.

The data stored within Memory 102B-3 may be similar to the data stored within Memory 102A-4 described in connection with FIG. 2A, the description of which applying herein.

Computing system 102B, in embodiments, may include Computing System Independent Power Source 102B-4.

In embodiments, Computing System Independent Power Source 102B-4 may provide a dedicated power supply to Computing System 102B, ensuring continuous operation even in the absence or failure of System 100's primary power source. In some embodiments, Computing System Independent Power Source 102B-4 may consist of rechargeable batteries, supercapacitors, or fuel cells, each capable of supporting extended functionality for remote or mobile deployments. Additionally, Computing System Independent Power Source 102B-4 may incorporate energy-harvesting technologies, such as solar panels or thermoelectric generators, which enable Computing System 102B to recharge or supplement its power based on available environmental resources. Power management circuitry within Computing System Independent Power Source 102B-4 may regulate energy levels, optimize power consumption, and control charging cycles, providing stability to Computing System 102B and supporting sustained operation during mission-critical activities.

In embodiments, Computing System Independent Power Source 102B-4 may be similar to Sensor Independent Power Source 102A-5, the description of which applying herein.

Automatic Net Reloading Module 102C, in embodiments, may include Net Storage Chamber 102C-1, Net Reloading Mechanism 102C-2, Network Connection Interface 102C-3, and Automatic Net Reloading Module Independent Power Source 102C-4. These components are configured to enable Automatic Net Reloading Module 102C to efficiently store and reload nets in a controlled and automated manner, ensuring that System 100 remains ready for successive interception attempts.

The nets used in System 100 are designed to effectively capture and immobilize objects within the detection area, and are constructed from durable yet flexible materials, such as, for example, high-tensile nylon, Kevlar, or other synthetic fibers known for strength and resistance to environmental factors. Each net, in embodiments, includes individual weights strategically spaced around its perimeter to facilitate controlled deployment and effective entrapment of the target object. These weights are configured to fold with the net, enabling compact storage within Net Storage Chamber 102C-1. The net weights are configured to spread the net evenly when deployed by Turret 106. The nets may be available in a variety of sizes to accommodate different operational scenarios, with typical radii ranging from approximately 2 meters for small, close-range objects to up to 10 meters for larger or more distant targets. The radius of each net may be selected based on the size of System 100, the intended deployment range, and the dimensions of the objects it is designed to intercept, allowing the system to adapt to various environmental and functional requirements. In embodiments, the size of System 100 may be adjusted to accommodate, for example, the scenario, the size of the object, and the distance the object may be when intercepted.

Net Storage Chamber 102C-1 may serve as the primary storage area for one or more nets used by System 100. Net Storage Chamber 102C-1 is configured to house each net of the one or more nets in a compact, preloaded configuration such that Turret 106 can receive and deploy each net. Net Storage Chamber 102C-1 is configured to store multiple nets. In embodiments, the capacity of Net Storage Chamber 102C-1 may depend on one or more of the following: operational requirements, the size of System 100, the intended deployment range, the dimensions of the objects it is designed to intercept, and the number of objects which may be present in the detection area. In some embodiments, Net Storage Chamber 102C-1 may be configured with segmented compartments or stacked slots, each compartment dedicated to an individual net. This design ensures that each net is organized and protected, preventing tangling or damage that could hinder deployment. The chamber may be constructed from durable, weather-resistant materials to withstand environmental conditions and physical stress, ensuring that stored nets remain intact and ready for use over extended periods. In embodiments, Net Storage Chamber 102C-1 is configured to store multiple types of nets, which may include, for example, nets of a different size, different weight, different material, and a combination thereof, to name a few.

The nets used in System 100 are designed to effectively capture and immobilize objects within the detection area, and are constructed from durable yet flexible materials, such as high-tensile nylon, Kevlar, or other synthetic fibers known for strength and resistance to environmental factors. Each net includes individual weights strategically spaced around its perimeter to facilitate controlled deployment and effective entrapment of the target object. These weights are configured to fold neatly with the net, allowing compact storage within Net Storage Chamber 102C-1, and are designed to spread the net evenly when deployed by Turret 106, ensuring maximum coverage and efficiency upon interception.

The nets may be available in a variety of sizes to accommodate different operational scenarios, with typical radii ranging from approximately 2 meters for small, close-range objects to up to 10 meters for larger or more distant targets. The radius of each net may be selected based on the size of System 100, the intended deployment range, and the dimensions of the objects it is designed to intercept, allowing the system to adapt to various environmental and functional requirements. The weights may be a uniform weight around each net. The uniform weight may vary depending on the size of System 100, the intended deployment range, and the dimensions of the objects it is designed to intercept, to name a few. In embodiments, the weights on an individual net may not be a uniform weight. The un-uniform weight may be configured to: increase the size of the detection area, increase the accuracy of the deployed net, render one or more objects effectively inoperable, and a combination thereof, to name a few.

Net Reloading Mechanism 102C-2 may be configured to automatically transfer nets from Net Storage Chamber 102C-1 to Turret 106, positioning each net for immediate deployment as needed. In some embodiments, the reloading mechanism may utilize a variety of motorized or mechanical components, including but not limited to springs, gears, pulleys, conveyors, robotic arms, air pressure systems, pistons, hydraulic actuators, tensioning cables, ratchets, magnetic tracks, screw drives, or belt-driven mechanisms to facilitate the movement of the net from Net Storage Chamber 102C-1 to Turret 106. These components may work individually or in combination to provide control and positioning of the net when loaded into Turret 106.

In embodiments, this mechanism may operate in synchronization with other components of System 100, such as Turret 106, to assist with transitions between deployments and to reduce delay between successive interception attempts. Additionally, in some embodiments, Net Reloading Mechanism 102C-2 may include integrated sensors or position-detection systems to verify the presence and correct orientation of each net. In embodiments where multiple nets are stored in sequence, the mechanism may be designed to automatically shift or cycle the next net into position as soon as the prior net is launched, facilitating rapid and efficient reloading.

Automatic Net Reloading Module 102C may load a net into a turret in a range of approximately 2 to 10 seconds, which, in embodiments, may depend on the specific configuration, size, and operational requirements of System 100. For high-speed deployments, advanced configurations, in embodiments, may enable reloading times to a range of approximately 2 to 4 seconds.

In embodiments, Net Reloading Mechanism 102C-2 may also be configured to be adaptable to different types or sizes of nets, enabling System 100 to carry a variety of nets for interception depending on the object size, distance, or environmental factors. In embodiments, Automatic Net Reloading Module 102C may be configured to load different types and sizes of nets to Turret 106 and reload different types of nets (i.e., first net loaded is a first type of net and the net reloaded is a second type of net) to Turret 106.

In some embodiments, the Net Reloading Mechanism 102C-2 may be positioned partially or entirely within Net Storage Chamber 102C-1.

Network Connection Interface 102C-3 may facilitate communication between Automatic Net Reloading Module 102C and other components within System 100, as well as external control systems if applicable. This interface may support both wired and wireless communication protocols, such as Ethernet, Wi-Fi, or Bluetooth, enabling real-time monitoring and control of the reloading process. Through Network Connection Interface 102C-3, the module may receive signals from Computing System 102B, allowing for remote configuration, status updates, and operational diagnostics. Network Connection Interface 102C-3 may also support secure communication protocols to protect data integrity and confidentiality when transmitting operational data or receiving remote commands.

Automatic Net Reloading Module Independent Power Source 102C-4 may provide an autonomous power supply to Automatic Net Reloading Module 102C, allowing it to function independently of System 100's primary power source (e.g., Power Module 102D). In some embodiments, Automatic Net Reloading Module Independent Power Source 102C-4 may consist of rechargeable batteries, supercapacitors, or other energy storage devices capable of sustaining reloading operations for extended periods. This independent power source ensures that net reloading operations can proceed even if primary system power is unavailable, maintaining System 100's readiness for multiple deployments. Additionally, Automatic Net Reloading Module Independent Power Source 102C-4 may include power management circuitry to monitor energy levels, optimize power usage, and regulate charging cycles, supporting reliable and uninterrupted operation of Automatic Net Reloading Module 102C.

Power Module 102D, in embodiments, may include Power Reserve 102D-1, Power Intake Port 102D-2, Recharge Interface 102D-3, Network Connection Interface 102D-4, Processor(s) 102D-5, and Power Distribution Circuitry 102D-6. These components are configured to enable Power Module 102D to store, manage, and distribute energy throughout System 100, supporting continuous and reliable operation across various components and modules of System 100.

Power Reserve 102D-1, in embodiments, may serve as the primary energy storage unit for Power Module 102D, designed to hold sufficient power to maintain System 100's functionality over extended periods. In some embodiments, Power Reserve 102D-1 may include rechargeable batteries, supercapacitors, or other energy-dense storage solutions capable of sustaining high-energy demands, particularly in scenarios that require multiple successive deployments. The capacity of Power Reserve 102D-1 may be tailored based on the specific power requirements of System 100, ensuring that critical operations can continue even under demanding conditions.

Power Intake Port 102D-2, in embodiments, may provide a connection point for external power sources, allowing Power Module 102D to receive energy from standard AC or DC power supplies, generators, or renewable sources such as solar panels, to name a few. Power Intake Port 102D-2, in embodiments, may be configured to accept various voltage levels and may include safety mechanisms, such as circuit breakers or surge protectors, to prevent power fluctuations from damaging System 100.

Recharge Interface 102D-3 may facilitate the recharging of Power Reserve 102D-1 from external sources connected via Power Intake Port 102D-2. In some embodiments, Recharge Interface 102D-3 may include adaptive charging technology, such as fast-charging circuits or load-balancing mechanisms, to optimize recharge times and extend the lifespan of Power Reserve 102D-1. Recharge Interface 102D-3, in embodiments, may also support energy-harvesting methods, enabling Power Module 102D to recharge from intermittent sources, such as kinetic or thermal energy.

Network Connection Interface 102D-4 may facilitate communication between Power Module 102D and other components within System 100, as well as external monitoring systems or control devices. Network Connection Interface 102D-4 may support wired and wireless protocols, including Ethernet, Wi-Fi, or Bluetooth, enabling real-time monitoring of power levels, energy distribution, and recharging status. Network Connection Interface 102D-4 may allow Computing System 102B or remote operators to access power data, control recharging processes, or receive alerts when power levels reach critical thresholds. Additionally, secure communication protocols may be implemented via Network Connection Interface 102D-4 to protect data integrity and confidentiality during power management operations.

Processor(s) 102D-5 may manage the operations of Power Module 102D, including power allocation, recharging, and communication with other system components, to name a few. Processor(s) 102D-5 may include suitable processing circuitry, such as a central processing unit (CPU), digital signal processor (DSP), or microcontroller, designed to execute power management algorithms, monitor power usage trends, and optimize energy distribution based on the real-time demands of System 100. Processor(s) 102D-5 may also facilitate remote diagnostics, allowing operators to adjust power settings and maximize system efficiency.

In embodiments, Processor(s) 102D-5 may be similar to Processor 102B-1 and to Processor 102A-2, each described in connection with FIG. 2B, the descriptions of which apply herein.

Power Distribution Circuitry 102D-6 may provide controlled delivery of energy from Power Reserve 102D-1 to various modules within System 100, including Sensor Module 102A, Computing System 102B, Automatic Net Reloading Module 102C, Camera 104, and Turret 106. This circuitry may incorporate voltage regulation, current limiting, and circuit protection features to ensure stable and safe power supply across all connected components. In some embodiments, Power Distribution Circuitry 102D-6 may include multiple power output channels, each dedicated to specific modules, allowing for prioritized power allocation and minimizing the risk of power interruptions. Processor(s) 102D-5 may manage the operations of Power Distribution Circuitry 102D-6.

Referring back to FIG. 1, in embodiments, System 100 may further include Camera 104 and Turret 106. A more detailed depiction of Camera 104 and Turret 106 is in FIG. 2B.

Figure 2B:
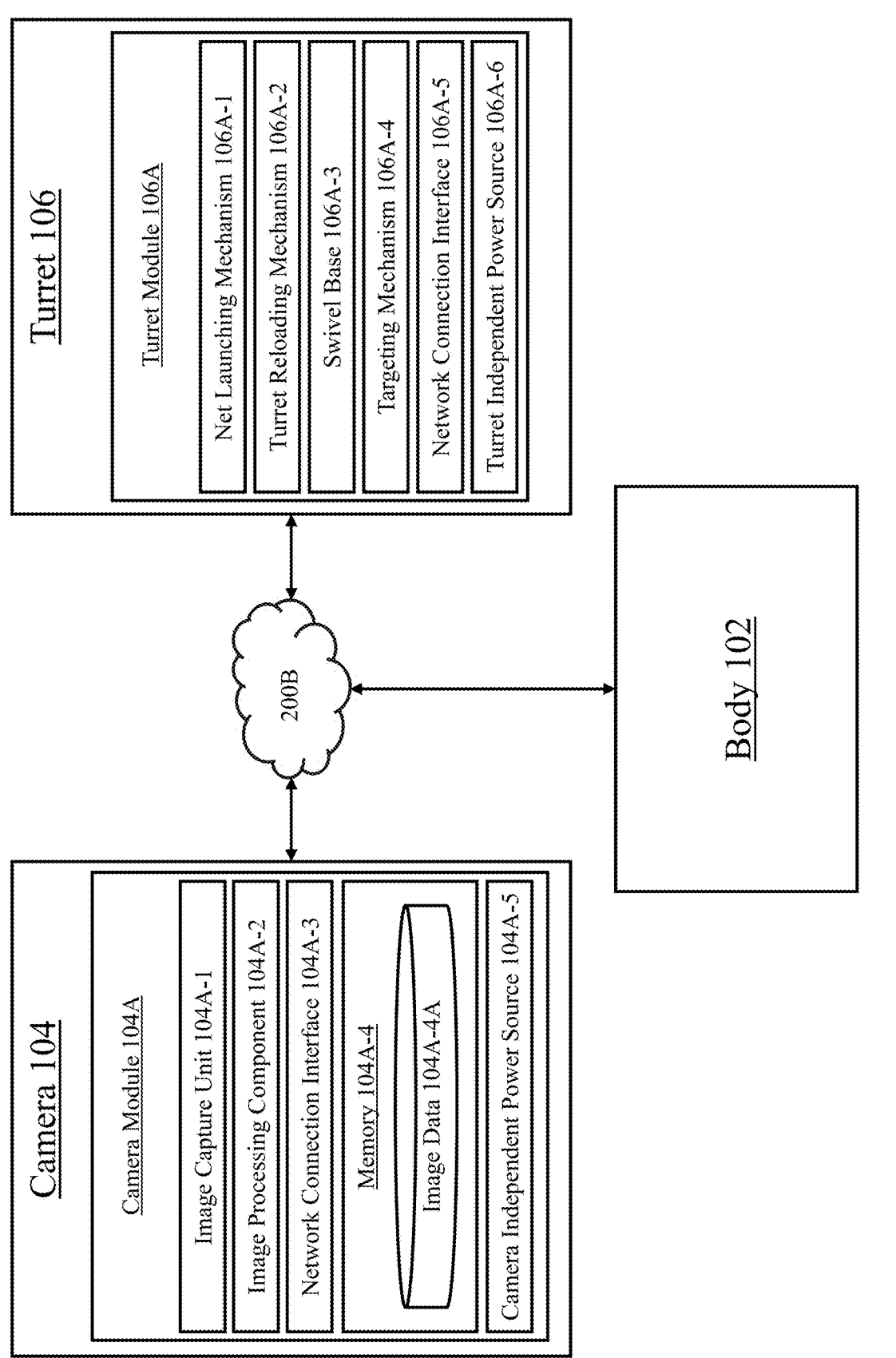
FIG. 2B is a schematic diagram of a body, camera, and turret of the system depicted in FIG. 1, in accordance with exemplary embodiments of the present invention.

Referring to FIG. 2B, Camera 104, Turret 106, and Body 102 may be operatively connected via Network 200B. Network 200B, in embodiments, may be a hard-wired connection between each of Camera 104, Turret 106, and Body 102. Network 200B, in embodiments, may be a wireless connection between each of Camera 104, Turret 106, and Body 102. Network 200B, in embodiments, may include more than one network, and, in embodiments, may be a combination of a wireless and hard-wired connection between each Camera 104, Turret 106, and Body 102. For example, the Turret 106 may be hardwired to Body 102 while Camera 104 communicates via a wireless network.

Camera 104 may serve as a primary visual detection component within System 100, providing high-resolution imagery and real-time visual data to aid in object identification, tracking, and classification. Camera 104 may include Camera Module 104A, which, in embodiments, may consist of Image Capture Unit 104A-1, Image Processing Component 104A-2, Network Connection Interface 104A-3, Memory 104A-4, and Camera Independent Power Source 104A-5. These components are configured to enable Camera 104 to operate as a self-contained unit, capable of capturing, processing, and transmitting visual data efficiently and autonomously.

Image Capture Unit 104A-1 may provide the primary functionality for image acquisition, enabling Camera 104 to capture still images and video at various resolutions and frame rates depending on operational needs. In some embodiments, Image Capture Unit 104A-1 may be equipped with features such as optical zoom, infrared or night vision modes, and wide-angle lenses, allowing it to capture clear and detailed images across a wide range of distances, angles, and lighting conditions. These capabilities are configured to support System 100's ability to monitor the detection area comprehensively, regardless of environmental factors.

Image Processing Component 104A-2 may handle preliminary image analysis, such as edge detection, object recognition, and motion tracking, enabling Camera 104 to filter and refine captured data before transmission to Computing System 102B via Network 200B. In some embodiments, Image Processing Component 104A-2 may be equipped with machine learning algorithms or other AI-based models to enhance image processing capabilities, allowing for more accurate object classification and improved detection accuracy within System 100. This preprocessing, in embodiments, reduces the computational load on Computing System 102B, improving the overall efficiency of System 100. In embodiments, Image Processing Component 104A-2 may be similar to Processor(s) 102D-5, to Processor 102B-1, and to Processor 102A-2, each described in connection with FIG. 2B, the descriptions of which apply herein.

Network Connection Interface 104A-3 may facilitate communication between Camera Module 104A and other components within System 100, as well as any connected external systems if applicable. This interface may support wired and wireless communication protocols, such as Ethernet, Wi-Fi, or Bluetooth, allowing Camera 104 to transmit Image Data 104A-4A to Computing System 102B in real time. Network Connection Interface 104A-3 may also support secure communication protocols to maintain data integrity and prevent unauthorized access during data transmission.

Memory 104A-4 may store data and system configurations for Camera Module 104A. In some embodiments, Memory 104A-4 may include Image Data 104A-4A, which consists of the visual data captured by Image Capture Unit 104A-1. Image Data 104A-4A may include raw or processed images and video, ready for analysis by Computing System 102B or further processing within Camera Module 104A. Memory 104A-4 may also store operational parameters, such as detection settings and image processing algorithms, which are configured to enable Camera 104 to adapt to changing environmental or mission-specific conditions. In embodiments, Memory 104A-4 may also include Visual Identification Data, which may similar to the identification data stored in Sensor Module 102A described above in connection with FIG. 2A, the description of which applying herein. The Visual Identification Data may include visual characteristics such as shape, size, color patterns, and other distinguishing features of objects within the detection area to aid in accurate object recognition and classification.

Camera Independent Power Source 104A-5 may provide an autonomous power supply to Camera Module 104A, ensuring continuous operation regardless of the power status of other components within System 100. This power source may include rechargeable batteries or other energy storage solutions that allow Camera 104 to operate independently for extended periods, particularly in scenarios where consistent visual monitoring is critical. Camera Independent Power Source 104A-5 may also include power management circuitry to optimize energy usage and regulate charging cycles, ensuring the longevity and reliability of Camera 104's operations.

Some data received by Camera 104 may also be received by sensors within Sensor Module 102A, as Camera 104 may act as a sensor within Sensor Device 102A-1. This shared functionality enables System 100 to cross-reference visual and sensor data, enhancing object detection accuracy and improving the reliability of interception responses. In some embodiments, Camera 104 may be a Sensor Device 102A-1. In some embodiments, Camera 104 may be more than one camera.

Turret 106, in embodiments, may serve as the primary launch mechanism for deploying nets to intercept objects within the detection area. Turret 106 may deploy nets via Launch Barrel 106-1 using one, or more, or a combination thereof, of the following mechanisms: compressed air launch systems, spring-loaded actuators, pyrotechnic charges, electromagnetic launchers, hydraulic pistons, and mechanical tensioning systems, to name a few. Each mechanism provides a unique approach to controlling the speed, range, and trajectory of the net, configured to enable System 100 to adapt deployment based on specific interception requirements.

Turret 106 is configured to move and aim within a 360-degree range or at least within the detection area, allowing Turret 106 to target and intercept objects from any direction within its operational scope. In some embodiments, Turret 106 may include aiming components, such as laser targeting systems, infrared scopes, or motion-tracking sensors, to enhance precision and alignment with the target. Turret 106 may be constructed from durable materials, such as high-strength aluminum alloys, stainless steel, or reinforced polymers, providing both stability and resilience against environmental factors and operational stress. Rotation of Turret 106 may be achieved through motorized gears, servo systems, or hydraulic rotors, configured to enable smooth, rapid adjustments to positioning and allowing for continuous and reliable tracking of objects across the detection area.

Turret 106 may include Launch Barrel 106-1, which is configured to position and propel nets toward a detected object with precision and force. The power of Turret 106 may be adjustable, enabling operators to control the launch intensity based on the distance, size, and movement speed of the target object. In some embodiments, Launch Barrel 106-1 may be capable of varying its trajectory, angle, and orientation to maximize the range and effectiveness of each deployment.

The range of Turret 106 and the net it deploys may depend on one or more factors such as the force applied during launch and the aerodynamic design of the net itself. Turret 106 may have an operational range designed to intercept objects at varying distances, with launch capabilities sufficient to cover the entire detection area in certain configurations. By adjusting the power and angle of Launch Barrel 106-1, System 100 can effectively reach targets located at both short and extended ranges, configured to ensure flexible and adaptable interception capabilities across diverse operational scenarios.

In embodiments, Turret 106 may be configured to be operated remotely.

Referring back to FIG. 1, System 100 may further include Tracked Mobility Base 108, which provides a stable foundation for deploying and positioning System 100 and its components. In some embodiments, Tracked Mobility Base 108 may be configured as a stationary unit, anchoring System 100 in place while absorbing recoil forces generated during net deployment. This design is configured to enhance the accuracy and stability of each deployed net, particularly when Turret 106 is deployed at high power.

Tracked Mobility Base 108 may be equipped with tracks or similar mobility mechanisms to support System 100's movement over a variety of terrains, such as rough, uneven, or loose surfaces. The tracked design enables the system to navigate challenging environments while maintaining stability and minimizing vibration or movement during operation. This mobility base may also feature shock-absorbing elements and reinforced materials, allowing it to maintain operational effectiveness by reducing the impact of terrain-related stresses and ensuring System 100's components remain precisely aligned and ready for deployment.

Tracked Mobility Base 108 may be maneuvered either manually by one or more users, semi-autonomously, or autonomously by System 100, allowing it to reach and stabilize at a specified location within the operational area. When operated autonomously, Computing System 102B may control the movement of the base, guiding it to a target position based on pre-set coordinates or in response to sensor data, optimizing positioning for interception tasks.

In embodiments, System 100 may be a plurality of devices. In embodiments, System 100 may be one apparatus. The components of System 100, in embodiments, may be combined.

Figure 3A:
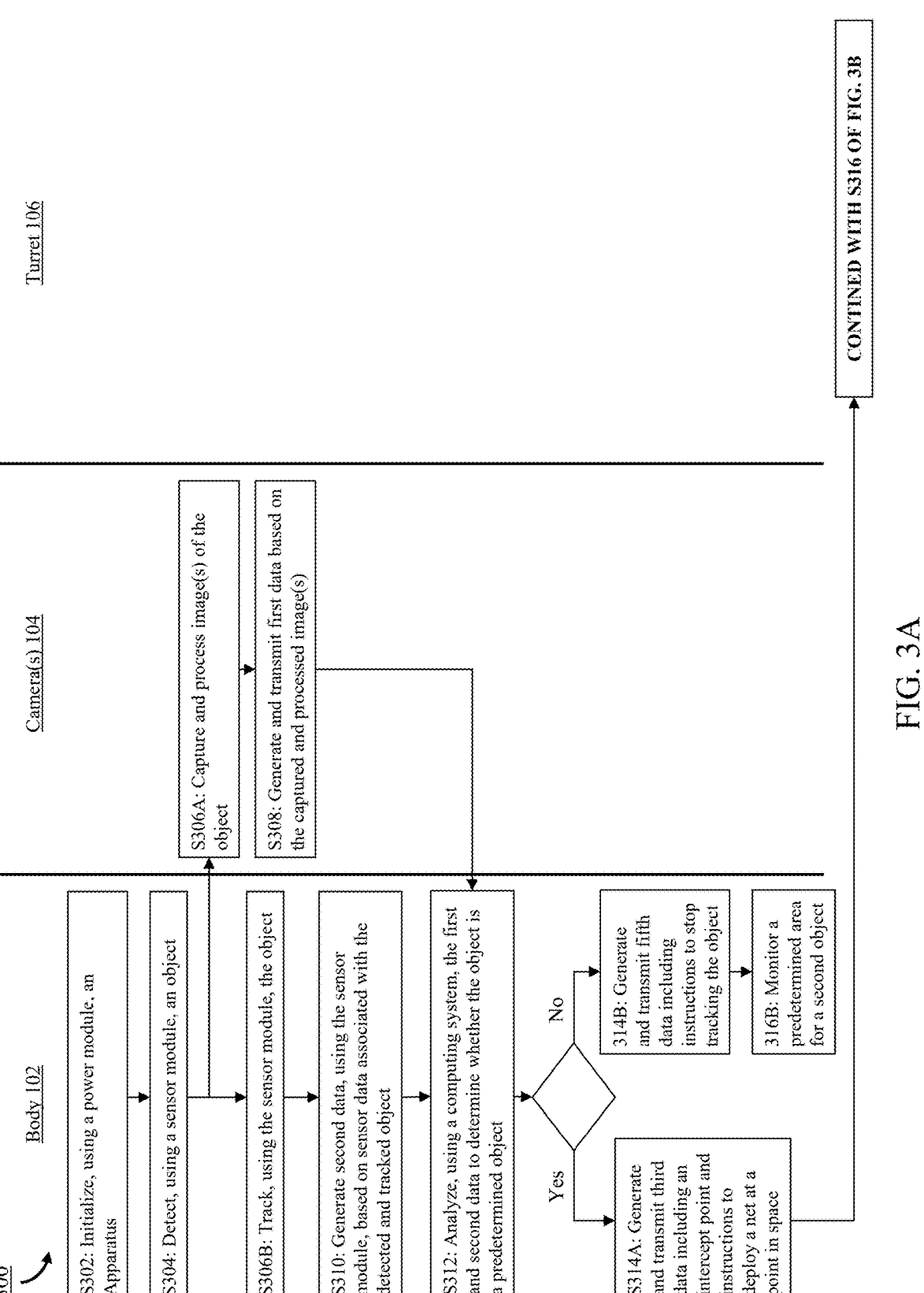
FIGS. 3A-3B are operational flow diagrams for detecting, tracking, and intercepting aerial and ground-based objects, in accordance with exemplary embodiments of the present invention.
Figure 3B:
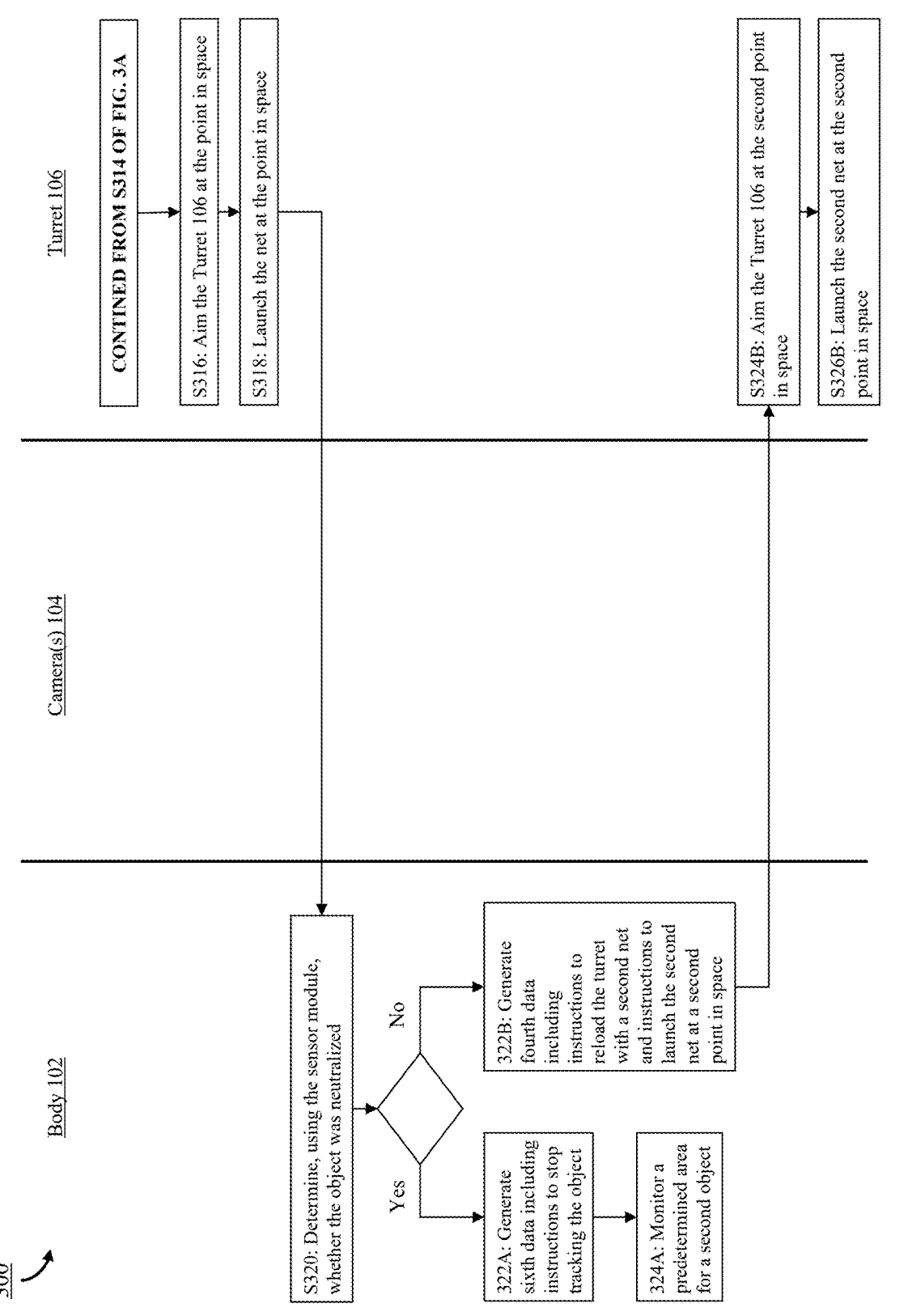

FIGS. 3A-3B are operational flow diagrams for detecting, tracking, and intercepting aerial and ground-based objects, in accordance with exemplary embodiments of the present invention.

Referring to FIG. 3A, process 300, in embodiments, may begin with step S302. At S302, Body 102 may initialize, via Power Module 102D, an Apparatus. The Apparatus, as used in connection with FIGS. 3A-4F may be similar to the description of System 100, described in connection with FIGS. 1-2B, the description of which applying herein.

In embodiments, process 300 may continue with step S304, where Body 102 may detect an object using Sensor Module 102A. During this step, Sensor Module 102A may scan the Predetermined Detection Area and identify anomalies or objects based on sensor readings from devices like RADAR, LIDAR, and infrared sensors, capturing preliminary data about the object's presence and location. Predetermined detection area, as used herein and throughout this description, as noted above, refers to a specified spatial region in which System 100 actively monitors, detects, and potentially intercepts objects. In embodiments, the detection area may be set by operators through inputting coordinates, boundary markers, or dimensional parameters into System 100. In embodiments, the detection area may be set automatically by System 100, adjusting dynamically based on a variety of factors, including the capabilities and limitations of Sensor Module 102A, sensor readings such as weather conditions, and the range of Turret 106's net deployment mechanism.

At step S306B, Body 102 may continue tracking the object via Sensor Module 102A. In embodiments, Sensor Module 102A may maintain a lock on the object's movement path by continuously monitoring its position, velocity, and direction, relaying updates in substantially real-time to Computing System.

In embodiments, a more detailed description of steps S304 and S306B is located in the description of FIG. 4A. Referring to FIG. 4A, process 300, step S304 may begin with step S304a. In step S304a, System 100 may provide parameters for the predetermined detection area (e.g., detection area described in connection with FIGS. 1-2B, the descriptions of which apply herein throughout the description of FIGS. 3A-4F), defining the specific area that the sensors will monitor for potential objects.

Step 304, in embodiments, may proceed with step S304b, where Sensor Module 102A collects and provides sensor data from various sensor devices of Sensor Module 102A, which may include environmental information and initial detection readings within the defined area.

Step 304, in embodiments, may proceed with step S304c, where Sensor Module 102A actively monitors the Predetermined Detection Area for the presence of any objects, continuously scanning for unusual patterns or movements. At step S304d, in embodiments, Sensor Module 102A detects at least one object by identifying anomalies within the detection area, such as unexpected motion, size, or temperature variations that differ from the baseline environmental data. Following this detection, step S304, in embodiments, may proceed to step 304e, where Sensor Module 102A stores the detected sensor data.

In embodiments, process 300 may then continue with step S306B, where Sensor Module 102A tracks the detected object. Step 306B, in embodiments, may begin with step S306B-a, where Sensor Module 102A locks onto the movement path of the object using multiple sensor devices, combining data from sensors like RADAR, LIDAR, and infrared to establish a continuous tracking path. As tracking proceeds, step 306B may continue with step S306B-b, where Sensor Module 102A provides real-time updates on the object's position, speed, and trajectory to Computing System 102B, allowing for accurate and ongoing monitoring of the object's movement within the Predetermined Detection Area.

Referring back to FIG. 3A, upon detecting an object, Body 102 may generate and transmit instructions to Camera 104, which, at step S306A, causes Camera 104 to capture and process image(s) of the object. Camera 104 may adjust its focus and position in response to initial sensor data, capturing high-resolution visuals that assist in further identifying the object's characteristics.

In embodiments, a more detailed description of step S306A is located in the description of FIG. 4B. Referring to FIG. 4B, step S306A, in embodiments, may being with step S306A-a, where Camera 104 adjusts its focus and positioning based on data received from Sensor Module 102A, aligning precisely with the object's location and movement to capture a clear visual representation. Following this adjustment, in embodiments, step S306A may proceed with step S306A-b, where Camera 104 captures one or more images of the object for the purpose of gathering visual data of the detected object.

In embodiments, step S306A may proceed with step S306A-c, where Camera 104 processes the captured images to enhance clarity by adjusting image parameters, such as contrast and brightness, and by removing ambient interference. This processing step may include digital filtering techniques to ensure that the object's features are accurately represented. In step S306A-d, Camera 104 generates image data, which includes data representing the processed image(s) of the object. This image data is subsequently transmitted to Computing System 102B for further analysis, where it can be cross-referenced with stored object profiles to determine if the detected object is a predetermined object.

Referring back to FIG. 3A, Process 300 may continue with step S308, where Camera 104 generates and transmits first data based on the captured and processed images. This first data may include visual attributes, such as object size, shape, and distinguishing features, which are then sent to Computing System 102B for deeper analysis.

At step S310, Sensor Module 102A generates second data based on additional sensor readings related to the detected and tracked object. This second data is configured to complement the visual information, providing specifics such as distance, speed, and environmental interaction, enhancing the profile for analysis. The data described herein may be similar to the data described in connection with FIGS. 1-2B, the descriptions of which applying herein.

Process 300, in embodiments, may continue with step S312. At step S312, Computing System 102B analyzes the combined first data received from Camera 104 and second data received from Sensor Module 102A to determine whether the detected object aligns with a predetermined object profile (similar to the object profiles described above in connection with FIGS. 1-2B, the descriptions of which applying herein). This process involves a detailed, multi-layered comparison of visual and sensor data points against stored object profiles, factoring in a verification percentage or confidence threshold to assess the likelihood that the object is a match.

The analysis may begin with a cross-referencing of key visual characteristics such as shape, size, color, and distinctive patterns-against predefined visual parameters stored in Memory 102B-3. This initial assessment helps filter potential threats based on known visual markers. Simultaneously, sensor-derived attributes, such as velocity, thermal signature, altitude, and movement trajectory, are compared to corresponding thresholds for designated threat types, enhancing identification accuracy through corroborative data.

In embodiments, Computing System 102B employs advanced algorithms, such as neural networks or machine learning models, to interpret complex patterns and relationships between the object's visual and sensor data. These models assign a verification percentage to each detected object, which represents the system's calculated confidence that the detected object matches a stored profile. This percentage may be derived from criteria such as similarity scores, statistical correlations, and specific pattern recognition metrics, weighted by factors like object behavior (e.g., erratic motion) or critical attributes (e.g., size).

In embodiments, to ensure reliable identification, a minimum confidence threshold may be applied, only allowing objects that meet or exceed this verification percentage to be classified as verified targets. This threshold is configured to reduce the risk of false positives by requiring that identified objects match stored profiles with a high degree of certainty. Additionally, in embodiments, Computing System 102B may incorporate historical data and contextual variables, such as recent weather conditions or known patterns in object behavior, to fine-tune its verification process and further validate identification.

If the verification percentage surpasses the defined threshold, Computing System 102B concludes that the object is a confirmed match to a predetermined profile, triggering System 100 to prepare for a response and continue with Step S314A.

Figure 4C:
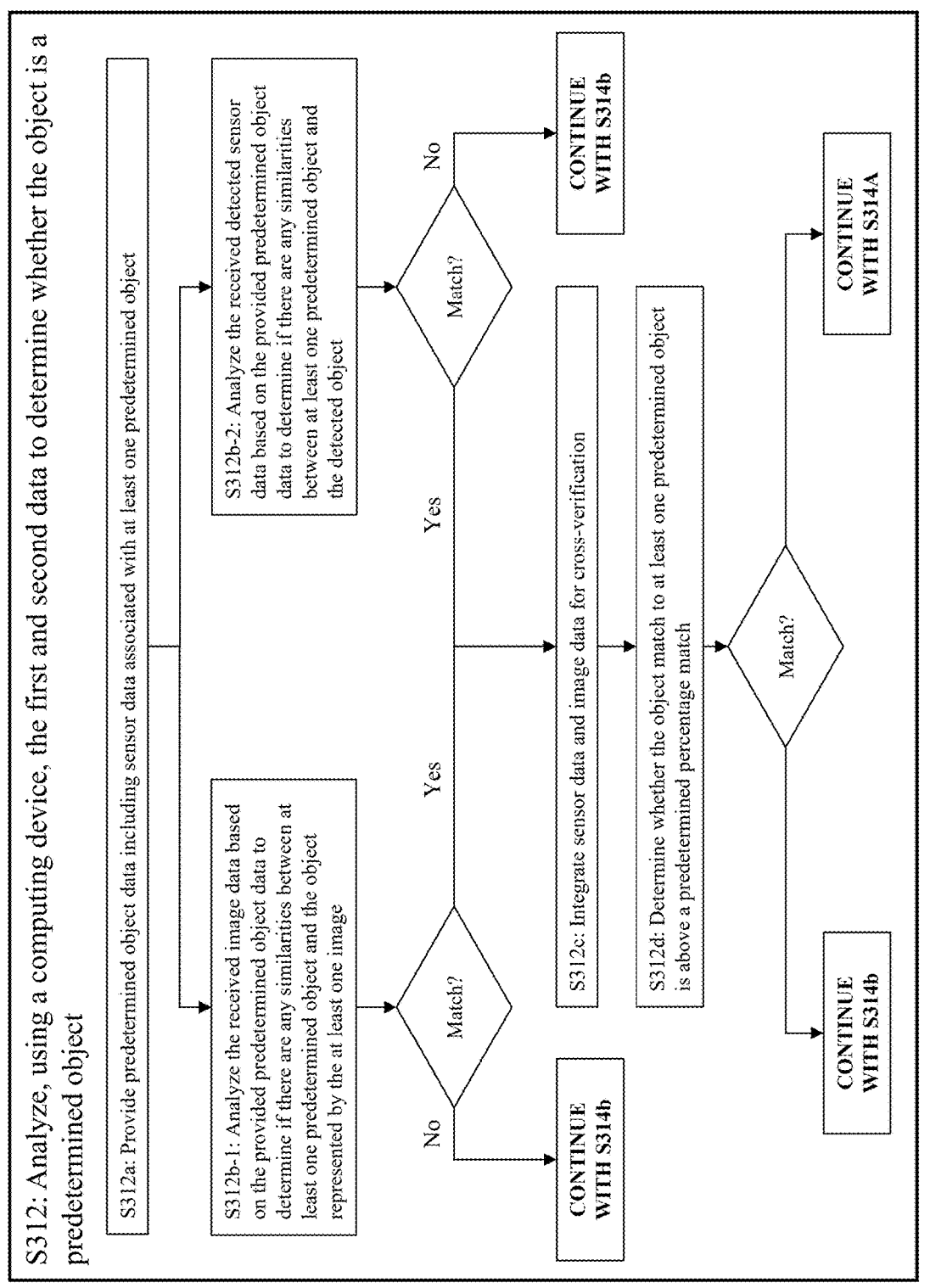
FIG. 4C is a flow chart illustrating an exemplary embodiment of step S312 of FIG. 3A, in accordance with exemplary embodiments of the present invention.

In embodiments, a more detailed description of step S312 is located in the description of FIG. 4C. Referring to FIG. 4C, process 300 may continue with step S312, where Computing System 102B analyzes the first and second data to determine if the object matches a predetermined object profile. Step S312, may, in embodiments, begin with step S312a. In step S312a, Computing System 102B provides predetermined object data, including sensor data associated with at least one predetermined object, serving as a reference for comparison against the detected object's characteristics. This object data may be provided as described in the present disclosure of the present invention, the description of which is applied herein.

In embodiments step S312 continues with step S312b-1, where Computing System 102B analyzes the received image data based on the provided predetermined object data to identify any similarities between at least one predetermined object and the object represented in the image. This comparison helps determine if the object's visual characteristics align with known profiles. If no match is found, process 300 may continue with step S314B.

In embodiments, in parallel, step S312 may proceed with step S312b-2, where Computing System 102B analyzes the received sensor data based on the predetermined object data to identify any similarities between at least one predetermined object and the detected object. This analysis focuses on sensor-derived attributes, such as motion patterns, temperature, or size, comparing them against stored profiles. If no match is found, process 300 may proceed to step S314B.

If a match is found at step S312b-1 or 312b-2, step S312 may proceed to step S312c. At step S312c, Computing System 102B, in embodiments, may integrate the sensor data and image data for cross-verification, combining both sets of information to strengthen the identification accuracy. By cross-referencing visual and sensor-based characteristics, the system ensures a comprehensive verification process.

Following this integration, in embodiments, step S312 may continue with S312d, where, in embodiments, Computing System 102B determines if the object matches at least one predetermined object with a confidence level above a predefined threshold, referred to as a predetermined percentage match. If the verification percentage is below this threshold, process 300 may continue with step S314B. However, if the verification percentage meets or exceeds the threshold, process 300 may continue with step S314A, indicating that the object is identified as a predetermined object and may require further action by System 100.

Referring back to FIG. 3A, if Computing System 102B determines that the object does not match a predetermined object profile, process 300 may, in embodiments, proceed with step S314B. At S314B, Computing System 102B, in embodiments, may generate and transmit fifth data to Sensor Module 102A and Camera 104 which includes instructions for Sensor Module 102A and Camera 104 to stop tracking the object. This step conserves system resources by discontinuing monitoring of non-relevant objects, allowing System 100 to focus on other potential threats within the detection area.

In embodiments, following step S314B, process 300 may continue with step S316B, where Computing System 102B resumes monitoring a predetermined detection area for any new or additional objects. During S316B, in embodiments, Sensor Module 102A may again scan the predetermined detection area, utilizing sensors such as RADAR, LIDAR, and infrared to detect the presence of a second object. If a second object is detected, process 300, in embodiments, would start again.

If Computing System 102B determines the object is a predetermined object, then, in embodiments, process 300 may continue with step S314A. At step S314A, Computing System 102B generates and transmits third data containing an intercept point and instructions for Turret 106 to deploy a net, ensuring that System 100 is ready to engage the object at the optimal moment and location.

Process 300, in embodiments, may continue with step S316 of FIG. 3B. Referring to FIG. 3B, process 300 may continue with step S316, where Turret 106 aims at the specified point in space. In embodiments, Turret 106 adjusts its position and orientation based on calculated targeting data from Computing System 102B, which may be included within third data, configured to ensure alignment with the intended interception point for the detected object.

Process 300, in embodiments, may continue with step S318, where Turret 106 launches the net at the specified point in space. Following the aiming step, Turret 106 deploys the net, targeting the detected object to neutralize it within the detection area. As used in connection with FIGS. 3A-4F, the term neutralize may refer to rendering the object effectively inoperable, such that it no longer poses a functional or operational threat within the Predetermined Detection Area. Nets, as used in connection with FIGS. 3A-4F may be similar to the nets described in connection with FIGS. 1-2B, the description of which applying herein.

Figure 4D:
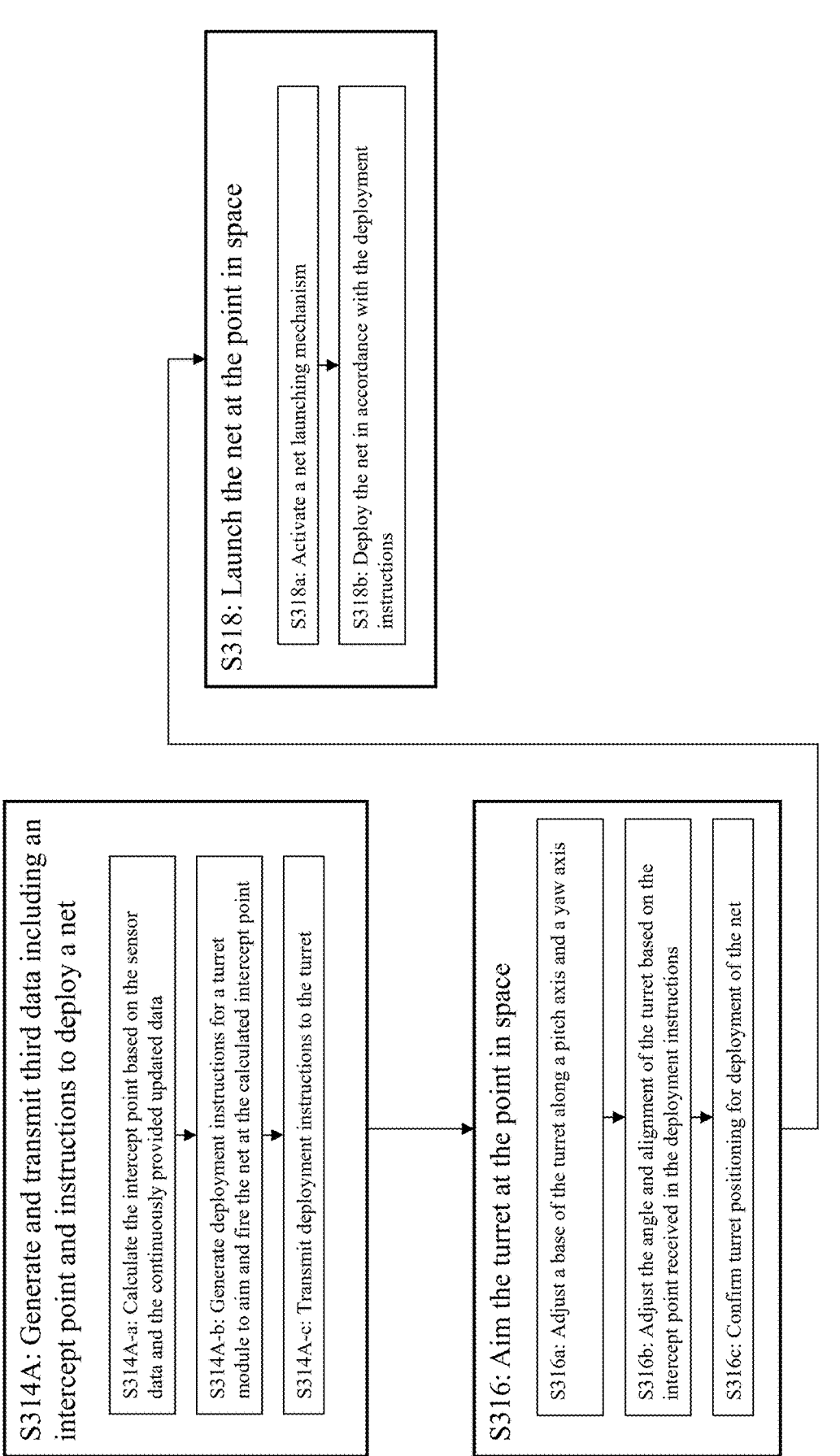
FIG. 4D is a flow chart illustrating an exemplary embodiment of steps S314A, S316, and S318 of FIGS. 3A-3B. in accordance with exemplary embodiments of the present invention.

In embodiments, a more detailed description of steps S314A, S316, and S318 is located in the description of FIG. 4D. Referring to FIG. 4D, process 300 may continue with step S314A, where Computing System 102B generates and transmits third data, which includes an intercept point and instructions to deploy a net. Step 314, in embodiments, may begin with step S314A-a. In step S314A-a, in embodiments, Computing System 102B calculates the intercept point based on sensor data and continuously updated data regarding the object's location and trajectory, determining the optimal location for interception. Step S314, in embodiments, may continue with step S314A-b, where, in embodiments, Computing System 102B generates deployment instructions for Turret 106, specifying the requirements to aim and fire the net at the calculated intercept point. Step S314A, in embodiments, may continue with step S314A-c. In step S314A-c, in embodiments, Computing System 102B transmits the generated deployment instructions to Turret 106, preparing Turret 106 for immediate action.

Process 300 may continue with step S316, where Turret 106 aims at the specified point in space. Step S316, in embodiments, may begin with step S316a. In step S316a, in embodiments, the base of Turret 106 is adjusted along both the pitch axis and the yaw axis, allowing precise alignment with the calculated intercept point. In embodiments, step S316 continues with step S316b, where Turret 106 adjusts its angle and alignment further, refining its orientation based on the intercept point data included in the generated deployment instructions. Step S316, in embodiments, may continue with step S316c. In step S316c, Turret 106 confirms its positioning, ensuring it is correctly aimed for optimal deployment of the net.

Following the aiming process, process 300, in embodiments, may proceed with step S318, where Turret 106 launches the net at the specified point in space. In embodiments, step S318 may begin with step S318a. In step S318a, Turret 106 activates a net launching mechanism, initiating the physical deployment sequence. In embodiments, step S318 may continue with step S318b, where Turret 106 deploys the net in accordance with the deployment instructions, ensuring that the net is launched accurately to intercept and neutralize the target at the intended intercept point.

Referring back to FIG. 3B, in step S320, Sensor Module 102A, in embodiments, determines whether the object was successfully neutralized. Sensor Module 102A monitors the object's response post-launch, analyzing movement and behavior to confirm if the net deployment effectively immobilized or captured the target.

Figure 4E:
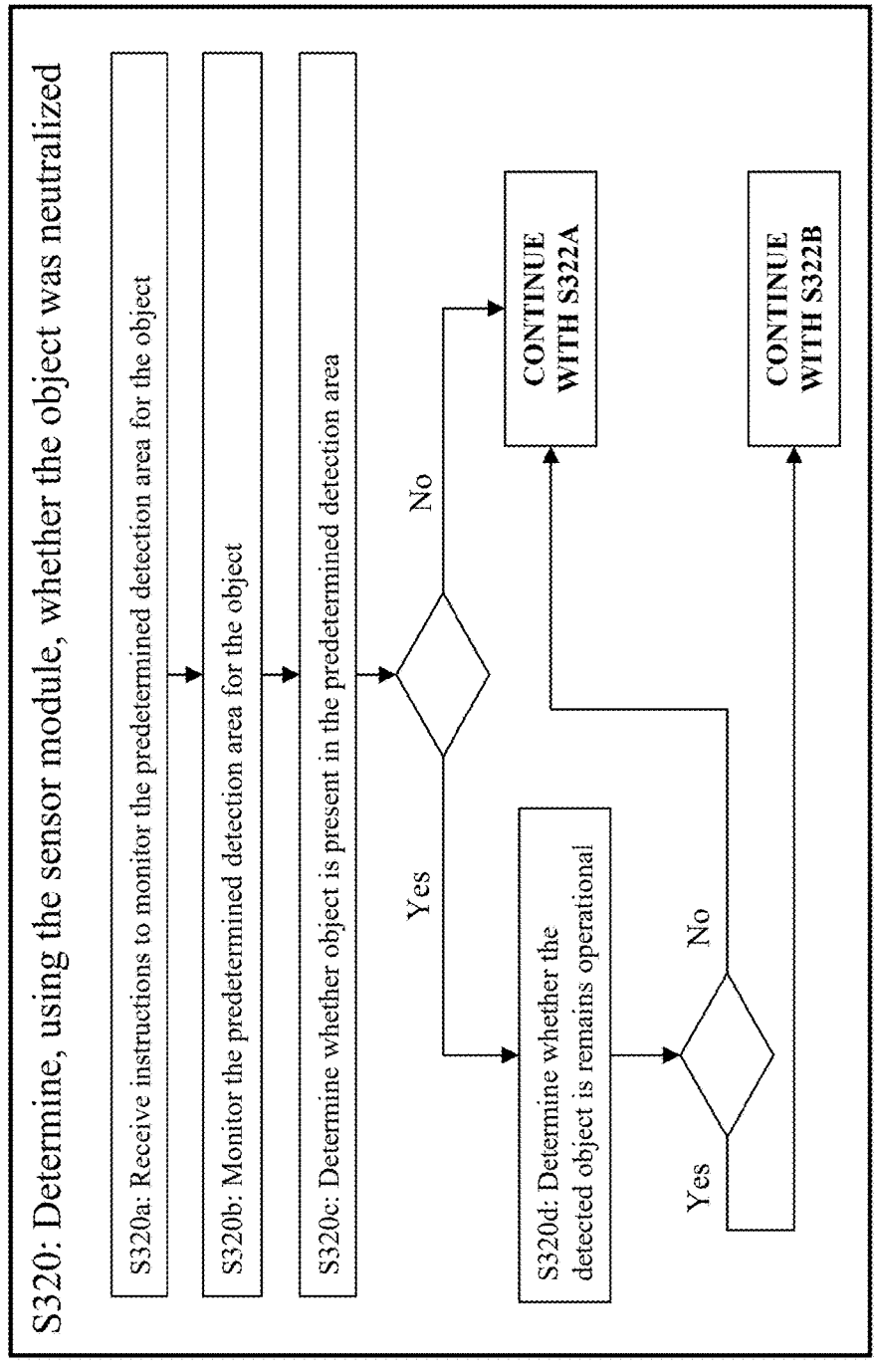
FIG. 4E is a flow chart illustrating an exemplary embodiment of step S320 of FIG. 3B, in accordance with exemplary embodiments of the present invention.

In embodiments, a more detailed description of step S320 is located in the description of FIG. 4E. Referring to FIG. 4E, process 300 may continue with step S320, where Sensor Module 102A determines whether the object was neutralized. Step S320, in embodiments, may begin with step S320a, where Sensor Module 102A receives instructions to monitor the Predetermined Detection Area specifically for the object's status post-interception, focusing on any remaining movement or functionality. Step S320*b*, in embodiments, may then proceed to step S320*b*, where Sensor Module 102A actively monitors the Predetermined Detection Area to track the object and assess its condition.

In step S320*c*, in embodiments, Sensor Module 102A determines if the object is still present within the Predetermined Detection Area. If the object is no longer present, process 300 may, in embodiments, continue with step S322A, indicating that the object has likely been removed from the detection area. However, if the object is detected within the area, in embodiments, process 300 can proceed to step S304*d*.

At step S320*d*, Sensor Module 102A determines whether the detected object remains operational, analyzing sensor data for signs of movement, power, or other activity that would indicate the object is still functional. If the object is determined to be operational, process 300, in embodiments may continue with step S322B. If the object is deemed non-operational, indicating it has been successfully neutralized, process 300 may, in embodiments, proceed with step S322A.

Referring back to FIG. 3B, if Sensor Module 102A determines that the object has been successfully neutralized, process 300, in embodiments, may continue with step S322A, where Computing System 102B generates sixth data including instructions to stop tracking the object. This step conserves resources by instructing Sensor Module 102A and other monitoring systems to cease further tracking of the neutralized object. Process 300, in embodiments, may proceed with step S324A, where System 100 resumes general monitoring to detect additional objects entering the Detection Area, ensuring readiness for new potential targets. In embodiments, Computing System 102B may generate and transmit instructions to the Automatic Net Reloading Module 102C, which, upon receipt, causes Automatic Net Reloading Module 102C to reload Turret with a second net. If a second object is detected, process 300 may start over.

If, however, Sensor Module 102A determines that the object was not successfully neutralized, process 300 may proceed with step S322B, where Computing System 102B, in embodiments, generates fourth data including instructions to reload Turret 106 with a second net and prepare for a follow-up launch. This step directs the Automatic Net Reloading Module 102C to position a second net in Turret 106 for immediate deployment.

Figure 4F:
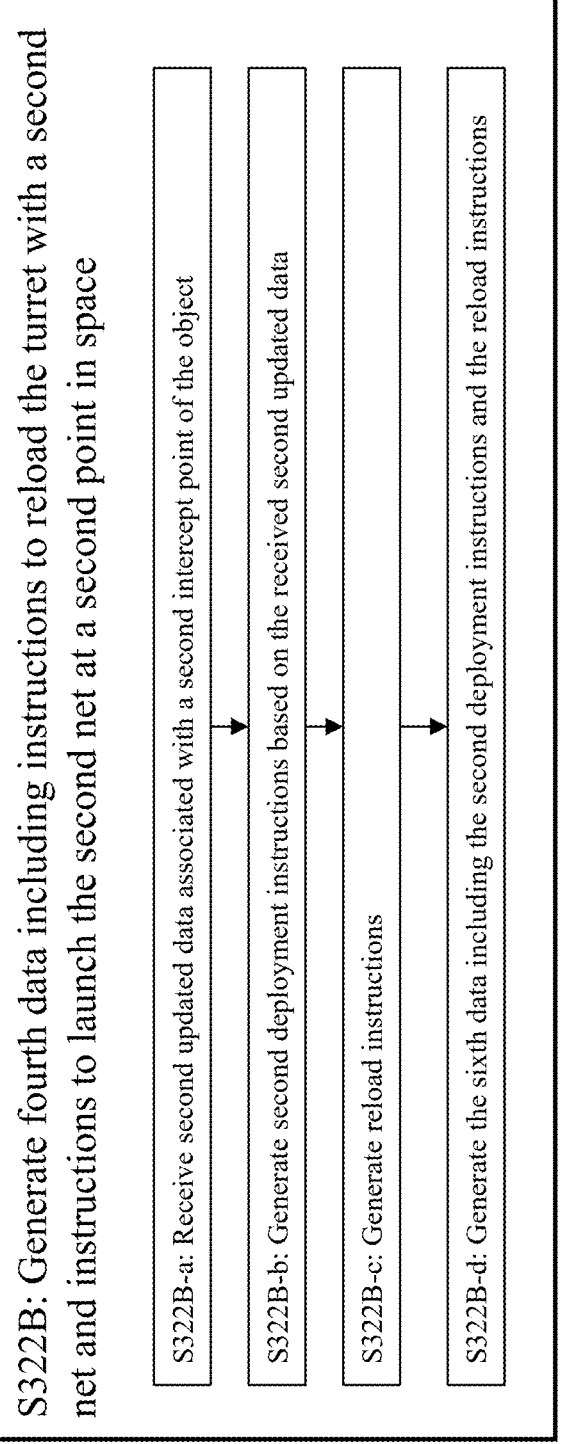
FIG. 4F is a flow chart illustrating an exemplary embodiment of step S322B of FIG. 3B, in accordance with exemplary embodiments of the present invention.

In embodiments, a more detailed description of step S322B is located in the description of FIG. 4F. Referring to FIG. 4F, process 300 may continue with step S322B, where Computing System 102B generates fourth data, including instructions to reload Turret 106 with a second net. In embodiments, step S322B may begin with step S322B-a. In step S322B-a, in embodiments, Computing System 102B receives second updated data associated with a recalculated intercept point of the object, reflecting any changes in the object's position or trajectory since the initial deployment attempt and/or to correct any launch mistakes. In embodiments, step S322B may continue with step S322B-b, where Computing System 102B generates second deployment instructions based on the received second updated data, specifying the new parameters required to aim and launch the second net accurately.

In embodiments, step S322B may continue with step S322B-c, where Computing System 102B generates reload instructions, directing the Automatic Net Reloading Module 102C to position a new net within Turret 106 for immediate use. In embodiments, step S322B may continue with step S322B-d where Computing System 102B, in embodiments, generates sixth data which includes the second deployment instructions and reload instructions.

Referring back to FIG. 3A, in embodiments, process 300 may then continue with step S324B, where Turret 106 aims at a second point in space. Computing System 102B calculates an updated interception point based on the object's current location and movement, and Turret 106 adjusts its aim accordingly. Computing System 102B may generates and transmits data containing a second intercept point and instructions for Turret 106 to deploy a net, ensuring that System 100 is ready to engage the object at the optimal moment and second location. In embodiments, process 300 may proceed with step S326B, where Turret 106 launches the second net at the recalculated target location, making a second attempt to neutralize the object. Process 300 may continue, in embodiments, with step S320 to determine whether the second net neutralized the detected object.

In embodiments, steps from process 300 may be rearranged or omitted.

Now that embodiments of the present invention have been shown and described in detail, various modifications and improvements thereon can become readily apparent to those skilled in the art. Accordingly, the exemplary embodiments of the present invention, as set forth above, are intended to be illustrative, not limiting. The spirit and scope of the present invention is to be construed broadly.

What is claimed is:

1. A system for intercepting aerial objects, comprising:
a plurality of sensor devices operatively connected via a network to a computing device, the plurality of sensor devices configured to:
monitor for movement in a plurality of directions within a predetermined detection area, wherein the plurality of sensor devices is positioned to detect movement within the predetermined detection area;
detect, within the predetermined area, movement associated with at least one object;
generate first data, the first data comprising:
a first speed of the at least one object;
a first direction of the at least one object; and
a first location of the at least one object; and
provide, via the network to the computing device, the first data;
wherein the plurality of sensor devices continuously monitor the at least one object within the predetermined detection area after providing the first data,
wherein the plurality of sensor devices continuously monitor the at least one object, generating updated data, until at least one of the following:
the at least one object is outside the predetermined detection area;
the at least one object has been intercepted; or
one or more instructions received by the computing device;
wherein the plurality of sensor devices comprise first communication circuitry configured to communicate, via the network, with the computing device;
a first camera, wherein the first camera is positioned to capture at least one image of the at least one object within the predetermined detection area and configured to:

capture a first image, wherein the at least one object is depicted on the first image;

generate second data comprising the first image; and provide, via the network to the computing device, the second data;

wherein the first camera comprises second communication circuitry configured to communicate, via the network, with the computing device;

a net launching device operatively connected, via the network, to the computing device and comprising:

a net-launching mechanism configured to deploy a first net toward a calculated intercept point in response to receiving one or more instructions from the computing device, the calculated intercept point being calculated by the computing device and being based at least on data provided by the plurality of sensor devices and the computing device;

a reloading chamber configured to store a plurality of netting;

a reloading mechanism, mechanically coupled to the net-launching mechanism and the reloading chamber, the reloading mechanism is configured to provide one net from the plurality of netting from the reloading chamber to the net-launching mechanism such that the one net is positioned in a manner where the net-launching mechanism can deploy the one net;

a swivel base configured to enable the net-launching mechanism to rotate along a pitch axis to adjust vertical positioning and a yaw axis to adjust horizontal positioning;

a targeting mechanism operatively controlled by the computing device via the network, wherein the targeting mechanism is configured to aim the net-launching mechanism toward a calculated intercept point provided by the computing device;

third communication circuitry configured to communicate, via the network, with the computing device; and the computing device configured to provide object data corresponding to a plurality of aerial objects, the object data including one or more of identifying characteristics comprising at least one of: dimensions, velocity, color, texture, thermal signature, flight path, material composition, radar cross-section, magnetic signature, sound signature, shape, acceleration patterns, relative position in airspace, and optical signature, wherein the object data further comprises a predetermined aerial object list, including at least one predetermined aerial object, wherein the object data comprises one or more identifying characteristics of the at least one predetermined aerial object;

receive the first data;

generate first instructions, the first instructions being based at least on the first data;

transmit, to the first camera via the network, the first instructions, such that upon receipt of the first instructions, the first camera captures the first image;

receive, from the first camera via the network, the second data;

generate third data via analysis of the second data, wherein the first image is compared to the object data for the purposes of identification of the at least one object depicted in the first image, and, wherein the third data includes information that indicates at least one finding associated with the analysis of the second data;

analyze the updated data based on the object data, the first data, and the third data, to determine an intercept point where the intercept point is a point in space where the at least one object will collide with the first net once deployed by the net-launching device;

generate fourth data based on the third data, and the analysis of the updated data, the third data including control instructions, wherein:

when the third data indicates that the at least one object corresponds to a predetermined aerial object of the at least one predetermined aerial objects, the control instructions comprise instructions for the net-launching device to deploy a net toward the calculated intercept point;

when the at least one object corresponds to an object outside the at least one predetermined aerial objects, the control instructions comprise instructions for the sensor devices cease instructions to cease monitoring the at least one object; and transmit, via the network, the fourth data, wherein, when the third data indicates that the at least one object corresponds to a predetermined aerial object of the at least one predetermined aerial objects, the fourth data is transmitted to the net-launching device such that, upon receipt, the net-launching device deploys the first net at the calculated intercept point, and when the at least one object corresponds to an object outside the at least one predetermined aerial objects, the fourth data is transmitted to the plurality of sensor devices such that, upon receipt of the fourth data, the plurality of sensor devices cease monitoring the at least one object.

2. The system of claim 1, wherein the network is a hard-wired network.

3. The system of claim 1, wherein the network is a wireless network.

4. The system of claim 1, wherein the network is a combination of a hard-wired network and a wireless network.

5. The system of claim 1, wherein the plurality of sensor devices comprises:

an inertial measurement unit configured to detect changes in the velocity within the predetermined detection area;

detect changes in acceleration of objects within the predetermined detection area; and detect changes in orientation of objects within the predetermined detection area.

6. The system of claim 1, wherein the plurality of sensor devices comprises:

a RADAR sensor configured to detect a distance of objects within the predetermined detection area;

detect a velocity of objects within the predetermined detection area;

detect a direction of objects within the predetermined detection area;

a GPS sensor configured to detect:

a location of objects within the predetermined detection area; and an inertial measurement unit configured to detect changes in the velocity within the predetermined detection area;

detect changes in acceleration of objects within the predetermined detection area; and detect changes in orientation of objects within the predetermined detection area.

7. The system of claim 6, wherein the plurality of sensor devices further comprises:

a LIDAR sensor configured to measure a distance of objects within the predetermined detection area; and measure a shape of objects within the predetermined detection area.

8. The system of claim 6, wherein the plurality of sensor devices further comprises:

an ultrasonic sensor configured to detect the range of objects within the predetermined detection area.

9. The system of claim 6, wherein the plurality of sensor devices further comprises:

a weather sensor configured to measure environmental conditions, the environmental conditions comprising:

wind speed;

wind direction;

air pressure; and precipitation.

10. The system of claim 6, wherein the plurality of sensor devices further comprises:

a thermal sensor configured to detect heat signatures of objects within the predetermined detection area.

11. The system of claim 6, wherein the plurality of sensor devices further comprises:

a time-of-flight sensor configured to calculate a distance from the net-launching device to objects within the predetermined detection area.

12. The system of claim 6, wherein the object data further comprises range data which indicates a maximum firing distance, and an optimal firing distance based on at least the following:

angle data which indicates an angle at which the first net is deployed based on positioning of the net-launching mechanism along the pitch axis and the yaw axis; and weather data which indicates weather conditions comprising, air resistance, wind speed, wind direction, air pressure, and precipitation; and an elevation of the net-launching device, wherein the elevation is measured from the net-launching device to a base of the system, wherein the optimal firing distance is less than the maximum firing distance.

13. A device for intercepting aerial objects, comprising:

a plurality of sensor devices operatively connected to a computing device, the plurality of sensor devices configured to:

monitor for movement in a plurality of directions within a predetermined detection area, wherein the plurality of sensor devices are positioned to detect movement within the predetermined detection area;

detect, within the predetermined area, movement associated with at least one object;

generate first data, the first data comprising:

a first speed of the at least one object;

a first direction of the at least one object; and a first location of the at least one object; and provide, to the computing device, the first data;

wherein the plurality of sensor devices continuously monitor the at least one object within the predetermined detection area after providing the first data, wherein the plurality of sensor devices continuously monitor the at least one object, generating updated data, until at least one of the following:

the at least one object is outside the predetermined detection area;

the at least one object has been intercepted; or one or more instructions received by the computing device;

wherein the plurality of sensor devices further comprises:

a RADAR sensor configured to detect a distance of objects within the predetermined detection area;

detect a velocity of objects within the predetermined detection area;

detect a direction of objects within the predetermined detection area;

a GPS sensor configured to detect a location of objects within the predetermined detection area; and an inertial measurement unit configured to detect changes in the velocity within the predetermined detection area;

detect changes in acceleration of objects within the predetermined detection area; and detect changes in orientation of objects within the predetermined detection area;

a first camera, wherein the first camera is positioned to capture at least one image of the at least one object within the predetermined detection area and configured to:

capture a first image, wherein the at least one object is depicted on the first image;

generate second data comprising the first image; and provide, to the computing device, the second data;

a net launching device operatively connected to the computing device and comprising:

a net-launching mechanism configured to deploy a first net toward a calculated intercept point in response to receiving one or more instructions from the computing device, the calculated intercept point being calculated by the computing device and being based at least on data provided by the plurality of sensor devices and the computing device;

a reloading chamber configured to store a plurality of netting;

a reloading mechanism, mechanically coupled to the net-launching mechanism and the reloading chamber, the reloading mechanism is configured to provide one net from the plurality of netting from the reloading chamber to the net-launching mechanism such that the one net is positioned in a manner where the net-launching mechanism can deploy the one net;

a swivel base configured to enable the net-launching mechanism to rotate along a pitch axis to adjust vertical positioning and a yaw axis to adjust horizontal positioning;

a targeting mechanism operatively controlled by the computing device, wherein the targeting mechanism is configured to aim the net-launching mechanism toward a calculated intercept point provided by the computing device;

the computing device configured to provide object data corresponding to a plurality of aerial objects, the object data including one or more of identifying characteristics comprising at least one of dimensions, velocity, color, texture, thermal signature, flight path, material composition, radar cross-section, magnetic signature, sound signature, shape, acceleration patterns, relative position in airspace, and optical signature, wherein the object data further comprises a predetermined aerial object list, including at least one predetermined aerial object, wherein the object data comprises one or more identifying characteristics of the at least one predetermined aerial object;

receive the first data;

generate first instructions, the first instructions being based at least on the first data;

transmit, to the first camera, the first instructions, such that upon receipt of the first instructions, the first camera captures the first image;

receive, from the first camera, the second data;

generate third data via analysis of the second data, wherein the first image is compared to the object data for the purposes of identification of the at least one object depicted in the first image, and, wherein the third data includes information that indicates at least one finding associated with the analysis of the second data;

analyze the updated data based on the object data, the first data, and the third data, to determine an intercept point;

generate fourth data based on the third data, and the analysis of the updated data, the third data including control instructions, wherein:

when the third data indicates that the at least one object corresponds to a predetermined aerial object of the at least one predetermined aerial objects, the control instructions comprise instructions for the net-launching device to deploy a net toward the calculated intercept point;

when the at least one object corresponds to an object outside the at least one predetermined aerial objects, the control instructions comprise instructions for the sensor devices cease instructions to cease monitoring the at least one object; and transmit the fourth data, wherein, when the third data indicates that the at least one object corresponds to a predetermined aerial object of the at least one predetermined aerial objects, the fourth data is transmitted to the net-launching device such that, upon receipt, the net-launching device deploys the first net at the calculated intercept point, and when the at least one object corresponds to an object outside the at least one predetermined aerial objects, the fourth data is transmitted to the plurality of sensor devices such that, upon receipt of the fourth data, the plurality of sensor devices cease monitoring the at least one object.

14. The device of claim 13, wherein the plurality of sensor devices further comprises:

a LIDAR sensor configured to measure a distance of objects within the predetermined detection area; and measure a shape of objects within the predetermined detection area.

15. The device of claim 13, wherein the plurality of sensor devices further comprises:

an ultrasonic sensor configured to detect the range of objects within the predetermined detection area.

16. The device of claim 13, wherein the plurality of sensor devices further comprises:

a weather sensor configured to measure environmental conditions, the environmental conditions comprising:

wind speed;

wind direction;

air pressure; and precipitation.

17. The device of claim 13, wherein the plurality of sensor devices further comprises:

a thermal sensor configured to detect heat signatures of objects within the predetermined detection area.

18. The device of claim 13, wherein the plurality of sensor devices further comprises:

a time-of-flight sensor configured to calculate a distance from the net-launching device to objects within the predetermined detection area.

19. The device of claim 13, wherein the object data further comprises range data which indicates a maximum firing distance, and an optimal firing distance based on at least the following:

angle data which indicates an angle at which the first net is deployed based on positioning of the net-launching mechanism along the pitch axis and the yaw axis; and weather data which indicates weather conditions comprising, air resistance, wind speed, wind direction, air pressure, and precipitation; and an elevation of the net-launching device, wherein the elevation is measured from the net-launching device to a base of the system, wherein the optimal firing distance is less than the maximum firing distance.

20. The device of claim 13, further comprising:

a power supply comprising at least one solar panel; and an energy storage unit configured to store electrical energy, the stored electrical energy comprising energy generated by the power supply.

* * * * *